US012065349B2

(12) United States Patent
Hayakawa

(10) Patent No.: US 12,065,349 B2
(45) Date of Patent: Aug. 20, 2024

(54) CLEANING AND STERILIZING METHOD FOR ASEPTIC FILLING MACHINE AND ASEPTIC FILLING MACHINE

(71) Applicant: Dai Nippon Printing Co., Ltd., Tokyo (JP)

(72) Inventor: Atsushi Hayakawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/997,761

(22) PCT Filed: May 14, 2021

(86) PCT No.: PCT/JP2021/018353
§ 371 (c)(1),
(2) Date: Nov. 2, 2022

(87) PCT Pub. No.: WO2021/230342
PCT Pub. Date: Nov. 18, 2021

(65) Prior Publication Data
US 2023/0159316 A1 May 25, 2023

(30) Foreign Application Priority Data
May 15, 2020 (JP) ................................ 2020-085838
May 29, 2020 (JP) ................................ 2020-094766
Sep. 25, 2020 (JP) ................................ 2020-160457

(51) Int. Cl.
*B67C 3/22* (2006.01)
*B67C 3/00* (2006.01)
*B67C 3/26* (2006.01)

(52) U.S. Cl.
CPC ........... *B67C 3/2642* (2013.01); *B67C 3/001* (2013.01); *B65B 2210/06* (2013.01)

(58) Field of Classification Search
CPC ......... B67C 3/001; B67C 3/002; B67C 3/004; B67C 3/2642; B65B 2210/06; B08B 9/0321
See application file for complete search history.

(56) References Cited

U.S. PATENT DOCUMENTS 8,776,842 B2 * 7/2014 Clusserath ............. B67C 3/004 141/90
10,226,796 B2 * 3/2019 Hayakawa ........... B67C 7/0073
(Continued)

FOREIGN PATENT DOCUMENTS

GB 1 062 990 A 3/1967
GB 1 184 883 A 3/1970
(Continued)

OTHER PUBLICATIONS

International Search Report and Written Opinion (Application No. PCT/JP2021/018353) dated Jun. 29, 2021 (with English translation).

(Continued)

*Primary Examiner* — Nicolas A Arnett
(74) *Attorney, Agent, or Firm* — BURR PATENT LAW, PLLC

(57) ABSTRACT

To efficiently perform CIP and SIP of an aseptic filling machine.
An upstream piping portion of a drink supply piping of an aseptic filling machine that extends through a heat sterilization apparatus is provided with an upstream feedback path to form an upstream circulation path, an aseptic surge tank piping portion that includes an aseptic surge tank that stores a drink sterilized by the heat sterilization apparatus is provided with an aseptic surge tank feedback path to form an aseptic surge tank circulation path, a downstream piping portion that extends to a filling nozzle via a filler tank that stores the drink supplied from the aseptic surge tank is
(Continued)

provided with a downstream feedback path to form a downstream circulation path, and the upstream piping portion, the aseptic surge tank piping portion and the downstream piping portion are individually subjected to CIP and SIP.

20 Claims, 14 Drawing Sheets

(56) References Cited

U.S. PATENT DOCUMENTS

| | | | | |
|---|---|---|---|---|
| 10,384,240 | B2 * | 8/2019 | Hayakawa | B08B 3/10 |
| 10,442,669 | B2 * | 10/2019 | Hayakawa | B08B 9/027 |
| 10,618,789 | B2 * | 4/2020 | Hayakawa | A61L 2/04 |
| 10,888,904 | B2 * | 1/2021 | Hayakawa | B67C 3/005 |
| 11,014,797 | B2 * | 5/2021 | Hayakawa | A61L 2/208 |
| 11,034,566 | B2 * | 6/2021 | Hayakawa | A61L 2/26 |
| 11,103,899 | B2 * | 8/2021 | Hayakawa | B67C 7/0073 |
| 11,186,474 | B2 * | 11/2021 | Hayakawa | A61L 2/186 |
| 11,498,823 | B2 * | 11/2022 | Hayakawa | B67C 3/22 |
| 11,542,137 | B2 * | 1/2023 | Hayakawa | B67C 3/005 |
| 11,691,861 | B2 * | 7/2023 | Hayakawa | A61L 2/04<br>134/18 |
| 11,708,257 | B2 * | 7/2023 | Hayakawa | B67C 3/001<br>134/22.11 |
| 11,745,990 | B2 * | 9/2023 | Hayakawa | B67C 3/001<br>134/26 |
| 11,753,287 | B2 * | 9/2023 | Hayakawa | B08B 3/02<br>134/26 |
| 11,780,719 | B2 * | 10/2023 | Hayakawa | A61L 2/04<br>134/26 |
| 11,834,315 | B2 * | 12/2023 | Hayakawa | B67C 3/10 |
| 11,873,203 | B2 * | 1/2024 | Kuwano | B67C 3/001 |
| 2018/0334372 | A1 | 11/2018 | Hayakawa et al. | |
| 2020/0277178 | A1 | 9/2020 | Hayakawa et al. | |
| 2020/0339401 | A1 | 10/2020 | Hayakawa et al. | |

FOREIGN PATENT DOCUMENTS

| | | | |
|---|---|---|---|
| JP | S56-057685 | A | 5/1981 |
| JP | H09-012093 | A | 1/1997 |
| JP | 2000-153245 | A | 6/2000 |
| JP | 2007-022600 | A | 2/2007 |
| JP | 2007-253093 | A | 10/2007 |
| JP | 2007-331801 | A | 12/2007 |
| JP | 2010-006429 | A | 1/2010 |
| JP | 2018-058641 | A | 4/2018 |
| JP | 2019-064722 | A | 4/2019 |
| JP | 2019-123526 | A | 7/2019 |

OTHER PUBLICATIONS

Japanese Office Action (with English translation) dated Feb. 21, 2023 (Application No. 2022-073499).

Extended European Search Report, European Application No. 21803172.2, dated May 6, 2024 (10 pages).

* cited by examiner

CLEANING AND STERILIZING METHOD FOR ASEPTIC FILLING MACHINE AND ASEPTIC FILLING MACHINE

TECHNICAL FIELD

The present invention relates to a cleaning and sterilizing method for an aseptic filling machine that fills a container such as a PET bottle with a drink, and the aseptic filling machine that fills a container with a drink.

BACKGROUND ART

When an aseptic filling machine fills a container such as a bottle with a drink, the drink itself has to be sterilized to be aseptic. In addition, CIP (Cleaning in Place) for cleaning the interior of drink supply piping and SIP (Sterilizing in Place) for sterilizing the interior of the drink supply piping have to be performed to make the interior of the drink supply piping aseptic, the drink supply piping being a path for feeding the drink to filling nozzles and including a surge tank, a liquid feeding pipe, filling valves and the like. CIP and SIP of the drink supply piping of the aseptic filling machine are performed regularly or each time the kind of the drink is changed (see Patent Literatures 1, 2 and 3).

CIP is performed by passing a cleaning liquid containing water and an alkali agent such as caustic soda as an additive through a flow path from the pipe line of the drink supply piping to the filing nozzles of the aseptic filling machine and then passing a cleaning liquid containing water and an acid agent as an additive. This removes a residue of the previous drink in the drink supply piping, for example (see Patent Literatures 1, 2 and 3).

SIP is a process to sterilize the interior of the drink supply piping before the drink filling operation is started, and is performed by passing a heated steam or heated liquid through the drink supply piping cleaned by CIP, for example. This sterilizes the interior of the drink supply piping and makes it aseptic (see Patent Literature 3).

CIP and SIP of the interior of the drink supply piping of the aseptic filling machine have to be performed over the entire drink supply piping. However, the flow path from the drink input tank to the filling nozzles for filling containers with a drink is too long for CIP and SIP, and the cleaning liquid for CIP and the sterilizer for SIP, which are heated in the upstream portion of the flow path, cool down before reaching the filling nozzles because the flow path is long, and therefore it takes a long time to complete CIP and SIP of the whole of the flow path. To solve this problem, the drink supply piping is divided into upstream drink supply piping including a drink heat sterilization apparatus and downstream drink supply piping from an aseptic surge tank for storing the sterilized drink to filling nozzles, and the upstream drink supply piping and the downstream drink supply piping are individually subjected to CIP and SIP (see Patent Literature 4).

Typically, after CIP using a cleaning liquid is performed, the cleaning liquid is rinsed off, and then SIP is performed using a sterilizer or heated liquid. In this regard, it is proposed to perform CIP and SIP concurrently or in sequence by heating the cleaning liquid used for CIP to a temperature required for SIP (Patent Literature 5). In this case, again, it is proposed to perform CIP and SIP concurrently or in sequence by dividing the drink supply piping into the upstream drink supply piping including a drink heat sterilization apparatus and the downstream drink supply piping from an aseptic surge tank for storing the sterilized drink and filling nozzles.

When the aseptic filling machine fills containers such as bottles with a drink, there are many filling nozzles, and a large amount of cleaning liquid and a large amount of rinse liquid are required at the same time in order to perform CIP and SIP of all the filling nozzles at the same time. Therefore, CIP of all the filling nozzles cannot be performed concurrently. In view of this, it is proposed to divide the many filling nozzles for performing CIP (see Patent Literatures 6 and 7).

CITATION LIST

Patent Literature

Patent Literature 1: Japanese Patent Laid-Open No. 2007-331801
Patent Literature 2: Japanese Patent Laid-Open No. 2000-153245
Patent Literature 3: Japanese Patent Laid-Open No. 2007-22600
Patent Literature 4: Japanese Patent Laid-Open No. 2018-058641
Patent Literature 5: Japanese Patent Laid-Open No. 2019-064722
Patent Literature 6: Japanese Patent Laid-Open No. H09-12093
Patent Literature 7: Japanese Patent Laid-Open No. 2010-6429

SUMMARY OF INVENTION

Technical Problem

The aseptic filling machine can assure the quality of the products manufactured by the aseptic filling machine by performing CIP and SIP of the inside of the drink supply piping with reliability.

When performing CIP and SIP of the flow path of the aseptic filling machine from the drink heat sterilization apparatus to the filling nozzles for filling containers with the drink, it takes a long time to complete CIP and SIP of the whole of the flow path, because the flow path of the drink supply piping is long, and the cleaning liquid for CIP and the sterilizer or heated liquid for SIP, which are heated in the upstream portion of the flow path, cool down before reaching the filling nozzles because of the long flow path. To solve this problem, the drink supply piping is divided into upstream drink supply piping including the drink heat sterilization apparatus and downstream drink supply piping from the aseptic surge tank for storing the heated and sterilized drink to filling nozzles, and the upstream drink supply piping and the downstream drink supply piping are individually subjected to CIP and SIP. CIP and SIP of the upstream drink supply piping including the heat sterilization apparatus can be efficiently performed. However, the efficiency of CIP and SIP of the downstream drink supply piping from the aseptic surge tank to the filling nozzles is decreasing, since the amount of drink charged per unit time is increasing because of the increase of filling speed of the aseptic filling machine and therefore the volume of the aseptic surge tank for storing the drink sterilized by the heat sterilization apparatus is increasing. The volume of the aseptic surge tank is as large as 10 $m^3$ to 40 $m^3$.

CIP and SIP of the upstream drink supply piping can be performed by forming a circulation path from the drink heat sterilization apparatus to a manifold valve or valve cluster that separates the upstream drink supply piping and the downstream drink supply piping. Since the heat sterilization apparatus can add required heat for SIP to the sterilizing medium, no special facility for CIP and SIP of the inside of the upstream drink supply piping is not needed, and there is no problem with CIP and SIP of the inside of the upstream drink supply piping.

However, in a drink manufacturing location where the aseptic surge tank and the filler are placed some distance away from each other, or because of the increase of volume of the aseptic surge tank, CIP and SIP of the downstream drink supply piping take a longer time. CIP of the inside of the aseptic surge tank requires a larger amount of cleaning liquid because of the increase of volume of the aseptic surge tank, and if the cleaning liquid is flowed to the filling nozzles and circulated, even one circulation takes a long time. Furthermore, using a large amount of sterilizer leads to an increase of cost. To avoid this, heated steam can be used for SIP. However, the heated steam cools down before reaching the filling nozzles, and therefore it takes a long time to sterilize the flow path from the aseptic surge tank to the filling nozzles with the heated steam. In addition, in the cooling process after the steam sterilization, the aseptic air is fed to the filler via the aseptic surge tank to cool the filler. However, the temperature of the cooling air rises in the aseptic surge tank, and it takes a long time until the tip end of the filler is cooled.

An aseptic filling machine for charging a carbonated drink, which is a drink containing carbon dioxide gas, includes a carbonating apparatus that carbonates the sterilized drink, and CIP and SIP of the piping including the carbonating apparatus are required.

Furthermore, when heated steam is used for SIP of the downstream drink supply piping, CIP and SIP cannot be performed concurrently or in sequence by raising the temperature of the cleaning liquid used for CIP to the required temperature for SIP.

Furthermore, since the amount of drink charged per unit time is increasing and the number of filling nozzles is also increasing because of the increase of filling speed of the aseptic filling machine, it has become difficult to provide a facility that prepares the large amount of cleaning liquid, rinse liquid, sterilizer and heated liquid for sterilization required to perform CIP and SIP of all the filling nozzles at the same time.

Since the products cannot be manufactured during CIP and SIP of the inside of the drink supply piping, the availability of the aseptic filling machine decreases, and the products cannot be efficiently manufactured. Therefore, there is a demand for a cleaning and sterilizing method for an aseptic filling machine for efficiently performing CIP and SIP of the aseptic filling machine, and an aseptic filling machine to which this method can be applied.

The present invention has been devised to solve such problems, and an object of the present invention is to provide a cleaning and sterilizing method for an aseptic filling machine that can perform CIP and SIP of the aseptic filling machine in a short time, increase the availability of the aseptic filling machine and allow efficient manufacture of products, and the aseptic filling machine.

Solution to Problem

A cleaning and sterilizing method for an aseptic filling machine according to the present invention is a cleaning and sterilizing method for an aseptic filling machine, the aseptic filling machine including drink supply piping for feeding a drink to an inside of a filler via a heat sterilization apparatus, wherein an upstream piping portion of the drink supply piping that extends through the heat sterilization apparatus is provided with an upstream feedback path to form an upstream circulation path, an aseptic surge tank piping portion that includes an aseptic surge tank that stores the drink sterilized by the heat sterilization apparatus is provided with an aseptic surge tank feedback path to form an aseptic surge tank circulation path, a downstream piping portion that extends to a filling nozzle via a filler tank that stores the drink supplied from the aseptic surge tank is provided with a downstream feedback path to form a downstream circulation path, and the upstream piping portion, the aseptic surge tank piping portion and the downstream piping portion are individually subjected to CIP (Cleaning in Place) and SIP (Sterilizing in Place).

In the cleaning and sterilizing method for an aseptic filling machine according to the present invention, preferably, a carbonating piping portion that includes a carbonating apparatus that carbonates the drink sterilized supplied from the aseptic surge tank storing the drink forms a carbonating circulation path, and the carbonating circulation path is individually subjected to CIP and SIP.

In the cleaning and sterilizing method for an aseptic filling machine according to the present invention, preferably, the CIP is performed in which a cleaning liquid is circulated in the upstream circulation path, the aseptic surge tank circulation path and the downstream circulation path to remove a residue or the like of the drink deposited in the upstream piping portion, the aseptic surge tank piping portion and the downstream piping portion, a temperature of the cleaning liquid is raised to a required temperature for the SIP for sterilizing at least one of the upstream piping portion, the aseptic surge tank piping portion and the downstream piping portion in an early stage or in the course of the CIP of at least one of the upstream circulation path, the aseptic surge tank circulation path and the downstream circulation path, the SIP being performed following the CIP, the SIP of at least one of the upstream piping portion, the aseptic surge tank portion and the downstream piping portion is then performed, and the cleaning liquid is washed away by aseptic water.

In the cleaning and sterilizing method for an aseptic filling machine according to the present invention, preferably, the CIP is performed in which a cleaning liquid is circulated in the carbonating circulation path to remove a residue or the like of the drink deposited in the carbonating piping portion, a temperature of the Cleaning liquid is raised to a required temperature for the SIP for sterilizing the carbonating piping portion in an early stage or in the course of the CIP of the carbonating circulation path, the SIP being performed following the CIP, the SIP of the carbonating piping portion is then performed, and the cleaning liquid is washed away by aseptic water.

In the cleaning and sterilizing method for an aseptic filling machine according to the present invention, preferably, the SIP of the aseptic surge tank is performed using heated steam.

In the cleaning and sterilizing method for an aseptic filling machine according to the present invention, preferably, the CIP is performed in which the cleaning liquid is circulated in the downstream circulation path, a temperature of the cleaning liquid is raised to a required temperature for the SIP for sterilizing the downstream piping portion in an early stage or in the course of the CIP, the SIP being performed following the CIP, the SIP of the downstream piping portion is then performed, and after the SIP, when lowering the temperature of the cleaning liquid or the aseptic water, a backpressure valve provided in the downstream circulation path is regulated to keep a pressure in the downstream circulation path to be equal to or higher than an atmospheric pressure.

In the cleaning and sterilizing method for an aseptic filling machine according to the present invention, preferably, when performing CIP of the downstream piping portion by circulating a cleaning liquid in the downstream circulation path, a circulation that involves flowing the cleaning liquid from the filler tank to the filling nozzle and a circulation that involves flowing the cleaning liquid in a reverse direction from the filling nozzle to the filler tank are performed.

In the cleaning and sterilizing method for an aseptic filling machine according to the present invention, preferably, a large number of filling nozzles for filling containers with the drink provided in the downstream piping portion are divided into a plurality of subsets, and a circulation that involves flowing the cleaning liquid from the filler tank to a divisional subset of filling nozzles and a circulation that involves flowing the cleaning liquid in a reverse direction from the divisional subsets of filling nozzles to the filler tank are performed.

In the cleaning and sterilizing method for an aseptic filling machine according to the present invention, preferably, when performing the SIP by circulating the cleaning liquid in the downstream circulation path, a circulation that involves flowing the cleaning liquid from the filler tank to the filling nozzle and a circulation that involves flowing the cleaning liquid in a reverse direction from the filling nozzle to the filler tank are performed.

An aseptic filling machine according to the present invention is an aseptic filling machine comprising drink supply piping for feeding a drink to an inside of a filler via a heat sterilization apparatus, wherein an upstream piping portion of the drink supply piping that extends through the heat sterilization apparatus is provided with an upstream feedback path to form an upstream circulation path, an aseptic surge tank piping portion that includes an aseptic surge tank that stores the drink sterilized by the heat sterilization apparatus is provided with an aseptic surge tank feedback path to form an aseptic surge tank circulation path, a downstream piping portion that extends to filling nozzles via a filler tank that stores the drink supplied from the aseptic surge tank is provided with a downstream feedback path to form a downstream circulation path, and the upstream piping portion, the aseptic surge tank piping portion and the downstream piping portion are individually subjected to CIP (Cleaning in Place) and SIP (Sterilizing in Place).

In the aseptic filling machine according to the present invention, preferably, a carbonating piping portion that includes a carbonating apparatus that carbonates the drink sterilized supplied from the aseptic surge tank storing the drink forms a carbonating circulation path, and the carbonating circulation path is individually subjected to CIP and SIP.

The aseptic filling machine according to the present invention preferably further comprises: a cleaning liquid supply apparatus that supplies a cleaning liquid to the upstream circulation path, the aseptic surge tank circulation path and the downstream circulation path; and a heat exchanging apparatus that heats the cleaning liquid supplied from the cleaning liquid supply apparatus or aseptic water to a required temperature for the SIP.

The aseptic filling machine according to the present invention preferably further comprises: a cleaning liquid supply apparatus that supplies a cleaning liquid to the carbonating circulation path; and a heat exchanging apparatus that heats the cleaning liquid supplied to the carbonating circulation path from the cleaning liquid supply apparatus or aseptic water supplied to the carbonating circulation path to a required temperature for the SIP.

The aseptic filling machine according to the present invention preferably further comprises heated steam supply apparatus that supplies heated steam to the aseptic surge tank.

In the aseptic filling machine according to the present invention, preferably, a backpressure valve is provided in the downstream circulation path, the backpressure valve being for keeping a pressure in the downstream circulation path to be equal to or higher than an atmospheric pressure when lowering the temperature of the cleaning liquid or the aseptic water after the SIP performed by heating the cleaning liquid or the aseptic water.

In the aseptic filling machine according to the present invention, preferably, the downstream circulation path is configured so that, when circulating the cleaning liquid in the downstream circulation path, a circulation that involves flowing the cleaning liquid from the filler tank to the filling nozzles and a circulation that involves flowing the cleaning liquid in a reverse direction from the filling nozzles to the filler tank are performed.

In the aseptic filling machine according to the present invention, preferably, the filling nozzles are divided into a plurality of subsets, and a divisional downstream circulation path from the filler tank to a divisional subset of filling nozzles is formed, and the divisional downstream circulation path is configured so that, when circulating the cleaning liquid in the divisional downstream circulation path, a circulation that involves flowing the cleaning liquid from the filler tank to the divisional subset of filling nozzles and a circulation that involves flowing the cleaning liquid in a reverse direction from the divisional subset of filling nozzles to the filler tank are performed.

Advantageous Effects of Invention

With the cleaning and sterilizing method for an aseptic filling machine and the aseptic filling machine according to the present invention, the drink supply piping of the aseptic filling machine is divided into three portions, the upstream piping portion, the aseptic surge tank piping portion and the downstream piping portion, which are individually subjected to CIP and SIP. Therefore, the time required for CIP and SIP of the aseptic filling machine can be reduced, and the production efficiency of the aseptic filling machine can be improved.

With the cleaning and sterilizing method for an aseptic filling machine and the aseptic filling machine according to the present invention, the drink supply piping of the aseptic filling machine for a drink containing carbon dioxide gas is divided into four portions, the upstream piping portion, the aseptic surge tank piping portion, the carbonating piping portion and the downstream piping portion, which are individually subjected to CIP and SIP. Therefore, the time required for CIP and SIP of the aseptic filling machine can be reduced, and the production efficiency of the aseptic filling machine can be improved.

In CIP and SIP of the upstream piping portion and the downstream piping portion, since the temperature of the cleaning liquid flowed for CIP in the upstream circulation path, the aseptic surge tank circulation path, the carbonating circulation path and the downstream circulation path is raised to the required temperature for SIP, and CIP and SIP are performed in sequence or at the same time, the time required for CIP and SIP can be further reduced, and the production efficiency of the aseptic filling machine can be substantially improved.

With the cleaning and sterilizing method for an aseptic filling machine and the aseptic filling machine according to the present invention, when performing CIP of the portion from the filler tank to the filling nozzle of the drink supply piping of the aseptic filling machine, the cleaning effect can be improved and the time for CIP can be reduced by flowing the cleaning liquid in the reverse direction from the filling nozzle to the filler tank.

With the cleaning and sterilizing method for an aseptic filling machine and the aseptic filling machine according to the present invention, when performing CIP of the portion from the filler tank to the filling nozzle of the drink supply piping of the aseptic filling machine, the cleaning effect can be improved and the time for CIP can be reduced by dividing a large number of filling nozzles into a plurality of subsets and flowing the cleaning liquid in the reverse direction from the divisional subset of filling nozzles to the filler tank. In addition, since CIP is performed by dividing a large number of filling nozzles into a plurality of subsets, there is no need to provide a facility for preparing a large amount of cleaning liquid.

When lowering the temperature of the cleaning liquid after CIP and SIP of the downstream circulation path is performed in sequence or at the same time by raising the temperature of the cleaning liquid flowed for CIP to the required temperature for SIP, the pressure in the downstream circulation path decreases because the temperature is lowered while the interior of the downstream circulation path is sealed to maintain the aseptic condition in the downstream circulation path. By providing the backpressure valve in the downstream circulation path and regulating the backpressure valve, the temperature in the downstream circulation path can be lowered while eliminating the effect of the load of the atmospheric pressure on the downstream circulation path whose inside pressure decreases because of the lowering of the temperature of the cleaning liquid.

DESCRIPTION OF EMBODIMENT

In the following, an embodiment of the present invention will be described with reference to the drawings.

A structure of an aseptic filling machine will be described first, and a cleaning and sterilizing method for the machine will then be described.

Figure 1:
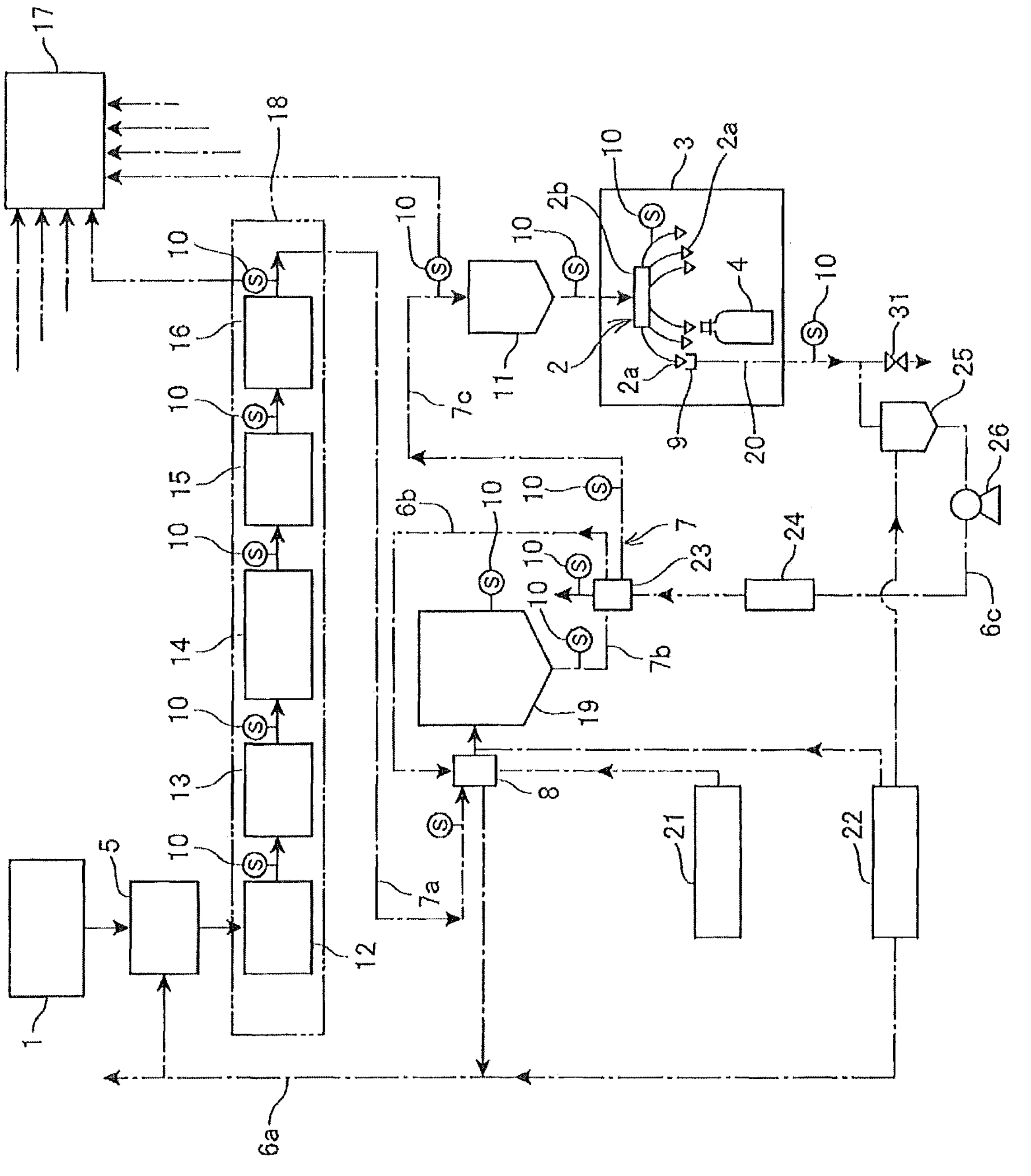
FIG. 1 is a block diagram showing an aseptic filling machine according to an embodiment of the present invention.

As shown in FIG. 1, an aseptic filling machine includes a drink preparation apparatus 1 and a filler 2 that fills a bottle 4 with a drink. The preparation apparatus 1 and a filling nozzle 2*a* in the filler 2 are connected by drink supply piping 7. A filling portion, which includes the filler 2, is shielded by a filling portion chamber 3.

A drink prepared in the preparation apparatus 1 is sterilized by a heat sterilization apparatus 18, the sterilized drink is stored in an aseptic surge tank 19, and the stored drink is fed to and stored in a filler tank 11. The drink stored in the filler tank 11 is fed to a filler manifold 2*b* of the filler 2, supplied to a large number of filling nozzles 2*a* from the filler manifold 2*b*, and charged into sterilized bottles 4 from the filling nozzles 2*a* in an aseptic atmosphere.

An upstream piping portion 7*a* of the drink supply piping 7 that passes through the heat sterilization apparatus 18 is provided with an upstream feedback path 6*a* to form an upstream circulation path, an aseptic surge tank piping portion 7*b* including the aseptic surge tank 19 that stores the drink sterilized by the heat sterilization apparatus 18 is provided with an aseptic surge tank feedback path 6*b* to form an aseptic surge tank circulation path, and a downstream piping portion 7*c* that passes through the filler tank 11 that stores the drink supplied from the aseptic surge tank 19 and the filling nozzles 2*a* is provided with a downstream feedback path 6*c* to form a downstream circulation path. In this way, the drink supply piping 7 is divided into three portions, the upstream piping portion 7*a*, the aseptic surge tank piping portion 7*b* and the downstream piping portion 7*c*, and these piping portions are individually subjected to CIP and SIP.

The preparation apparatus 1 prepares a drink such as a tea drink or a fruit juice drink according to a desired formula, and detailed description thereof will be omitted since the preparation apparatus 1 is a well-known apparatus.

The filler 2 is an apparatus that includes a large number of filling nozzles 2*a* arranged around a filler wheel 34 that rotates at high speed in a horizontal plane, and fills bottles 4 traveling below the filling nozzles 2*a* in synchronization with the circumferential speed of the filler wheel 34 with a fixed amount of drink from the filling nozzles 2*a* rotating with the filler wheel 34. The filling nozzles 2*a* of the filler 2 are arranged around the filler wheel 34, and the bottles 4 rotating with the filler wheel 34 are filled with a drink.

Viewed from the upstream to the downstream of the flow of the drink along the pipe line from the preparation apparatus 1 to the filler 2, the drink supply piping 7 of the aseptic filling machine includes the upstream piping portion 7*a* extending from a balance tank 5 to an upstream manifold valve 8 via the heat sterilization apparatus (UHT (Ultra High-Temperature)) 18, the aseptic surge tank piping portion 7*b* extending from the upstream manifold valve 8 to the downstream manifold valve 23 via the aseptic surge tank 19, and the downstream piping portion 7*c* extending from the downstream manifold valve 23 to the filling nozzles 2*a* via the filler tank 11.

Figure 6:
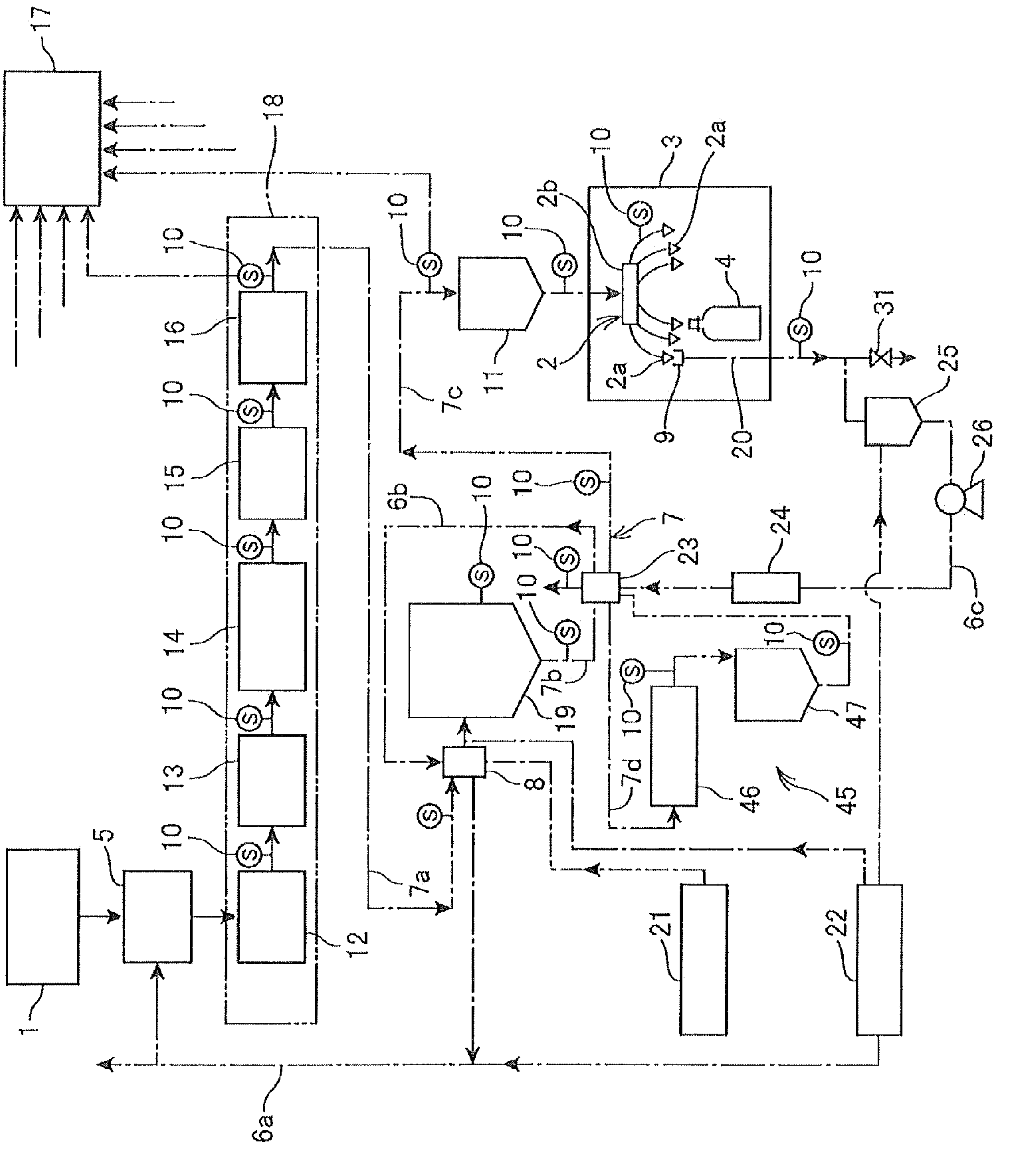
FIG. 6 is a block diagram showing the aseptic filling machine for a drink containing carbon dioxide gas according to the embodiment of the present invention.

As shown in FIG. 6, when the drink is carbonated to produce a carbonated drink, the drink supply piping 7 of the aseptic filling machine for a drink containing carbon dioxide gas includes a cooling apparatus, and a carbonating apparatus 46 and a carbonated drink surge tank 47 such as those shown in FIG. 6. The cooling apparatus, the carbonating apparatus 46 and the carbonated drink surge tank 47 are provided in the listed order from upstream to downstream between the aseptic surge tank 19 and the filler tank 11, and are connected to the downstream manifold valve 23 in order to flow the carbonated drink through the drink supply piping 7.

The sterilized drink supplied from the aseptic surge tank 19 via the downstream manifold valve 23 is carbonated by the carbonating apparatus 46, the carbonated drink is stored in the carbonated drink surge tank 47, the stored carbonated drink is supplied to the filler tank 11 via the downstream manifold valve 23, and the carbonated drink supplied to the filler tank 11 is charged into the bottles 4. The portion of the drink supply piping 7 that extends from the downstream manifold valve 23 back to the downstream manifold valve 23 via the carbonating apparatus 46 and the carbonated drink surge tank 47 is referred to as a carbonating piping portion 45.

The upstream piping portion of the drink supply piping 7 that passes through the heat sterilization apparatus 18 is provided with the upstream feedback path 6*a* to form the upstream circulation path, the aseptic surge tank piping portion 7*b* including the aseptic surge tank 19 that stores the drink sterilized by the heat sterilization apparatus 18 is provided with the aseptic surge tank feedback path 6*b* to form the aseptic surge tank circulation path, the carbonating piping portion 45 including the carbonating apparatus 46 that carbonates the sterilized drink supplied from the aseptic surge tank 19 that stores the drink forms a carbonating circulation path, and the downstream piping portion 7*c* that passes through the filler tank 11 that stores the carbonated drink supplied from the carbonated drink surge tank 47 and the filling nozzles 2*a* is provided with the downstream feedback path 6*c* to form the downstream circulation path. In this way, the drink supply piping 7 is divided into the upstream piping portion 7*a*, the aseptic surge tank piping portion 7*b*, the carbonating piping portion 45 and the downstream piping portion 7*c*, and these piping portions are individually subjected to CIP and SIP.

The filling nozzle 2*a* for charging the carbonated drink is provided with carbon dioxide gas supply piping 41 for supplying carbon dioxide gas and carbon dioxide gas discharge piping 42.

The heat sterilization apparatus 18 includes therein a first-stage heating portion 12, a second-stage heating portion 13, a holding tube 14, a first-stage cooling portion 15, and a second-stage cooling portion 16, for example. The drink or water supplied from the balance tank 5 is gradually heated while being fed from the first-stage heating portion 12 to the second-stage heating portion 13 until the temperature of the drink or water reaches a target temperature at the outlet of the second-stage heating portion 13, kept at the sterilization temperature for a certain time in the holding tube 14, and then fed to the first-stage cooling portion 15 and the second-stage cooling portion 16 and gradually cooled. The number of stages of the heating portions and the cooling portions is increased or decreased as required. The heat sterilization apparatus 18 may be provided with a homogenizer that can be automatically cleaned. The homogenizer is preferably provided between the first-stage heating portion where the temperature of the inside of the product is approximately 50° C. to 70° C. and the second-stage heating portion where the temperature of the inside of the product is approximately 60° C. to 150° C. or between the first-stage cooling portion and the second-stage cooling portion. Although a common homogenizer can be used in the former case, an aseptic homogenizer is needed in the latter case. The heat sterilization apparatus 18 can have any configuration, such as a shell and tube heat exchanger or a plate heat exchanger.

The drink is supplied from the filler tank 11 to the filler manifold 2*b* of the filler 2 via a rotary joint (not shown), and supplied from the filler manifold 2*b* to the filling nozzles 2*a* of the filler 2. The rotary joint may be provided on the top or bottom of the filling portion chamber 3, or rotary joints may be provided on both the top and bottom of the filling portion chamber 3.

Figure 9:
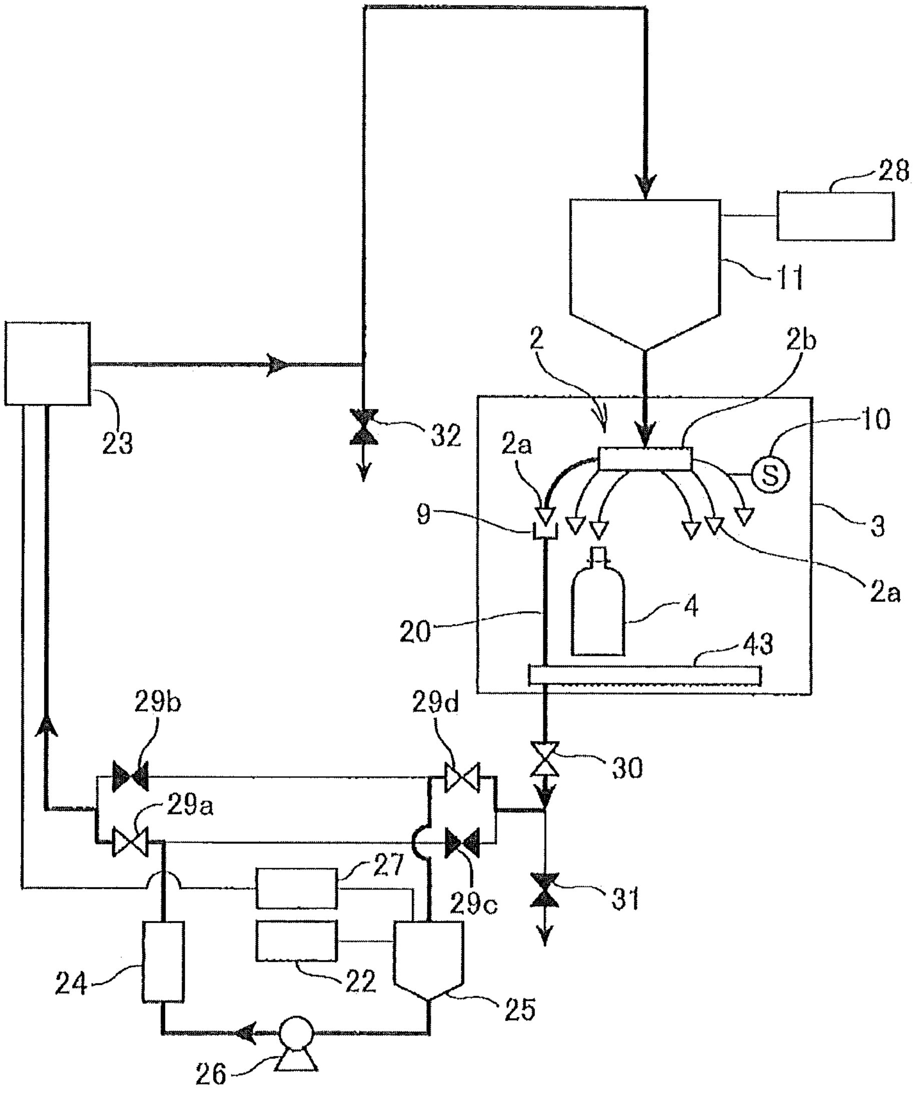
FIG. 9 is a detailed block diagram showing the aseptic filling machine according to the embodiment of the present invention in a state where CIP and SIP of a downstream piping portion from the filler tank to a divisional subset of filling nozzles are being performed.

An aseptic air supply apparatus is provided which supplies aseptic air to the aseptic surge tank 19, the filler tank 11 and a downstream storage tank 25. FIG. 9 shows an aseptic air supply apparatus 28 that supplies aseptic air to the filler tank 11. The upstream manifold valve 8 and the downstream manifold valve 23 are preferably provided with a vapor barrier or an aseptic water barrier in order that each of the upstream circulation path, the aseptic surge tank circulation path and the downstream circulation path can independently assume an aseptic condition or a non-aseptic condition.

The drink supply piping 7 may be provided with a filtration device that filters the drink. The filtration device may be provided between the aseptic surge tank 19 and the filler tank 11 or between the second-stage cooling portion 16 of the heat sterilization apparatus 18 and the upstream manifold valve 8, for example. A plurality of filtration devices may be installed in parallel. The filtration device may also be installed at other locations than those described above, such as upstream of the balance tank 5 or at the tip end of the filling nozzle 2*a*.

When filtration devices are provided in parallel, a first filtration device and a second filtration device are configured so that any of the filtration devices can be selected and used with a switch device. If such a switch device is provided, cleaning and inspection of filtration devices can be performed during manufacture of products by performing a cleaning process for removing foreign matters from the second filtration device while using the first filtration device for filling of products. CIP or SIP may be singly performed after cleaning and inspection of filters of the filtration devices. The switch device can also allow liquid feeding to both the first filtration device and the second filtration device, and in such a case, CIP or SIP of the first filtration device and the second filtration device can be concurrently performed.

Figure 2:
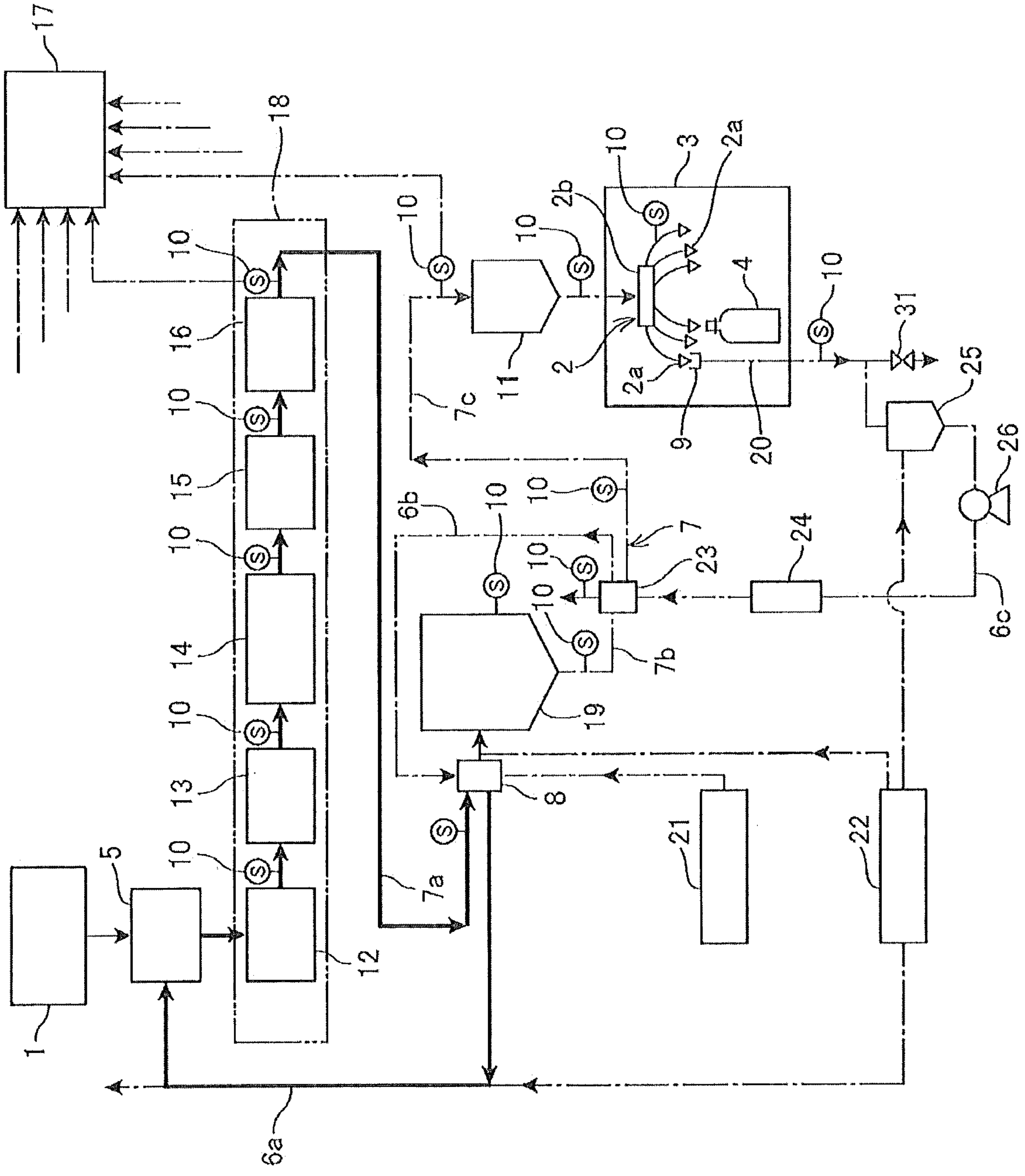
FIG. 2 is a block diagram showing the aseptic filling machine according to the embodiment of the present invention in a state where CIP and SIP of an upstream piping portion from a heat sterilization apparatus to before an aseptic surge tank are being performed.

As shown by the thick line in FIG. 2, the upstream circulation path used for performing CIP, SIP or concurrent CIP and SIP of the upstream piping portion 7*a* is formed by providing the upstream piping portion 7*a* of the drink supply piping 7 that extends to the upstream manifold valve 8 via the balance tank 5 and the heat sterilization apparatus 18 with the upstream feedback path 6*a*.

Figure 3:
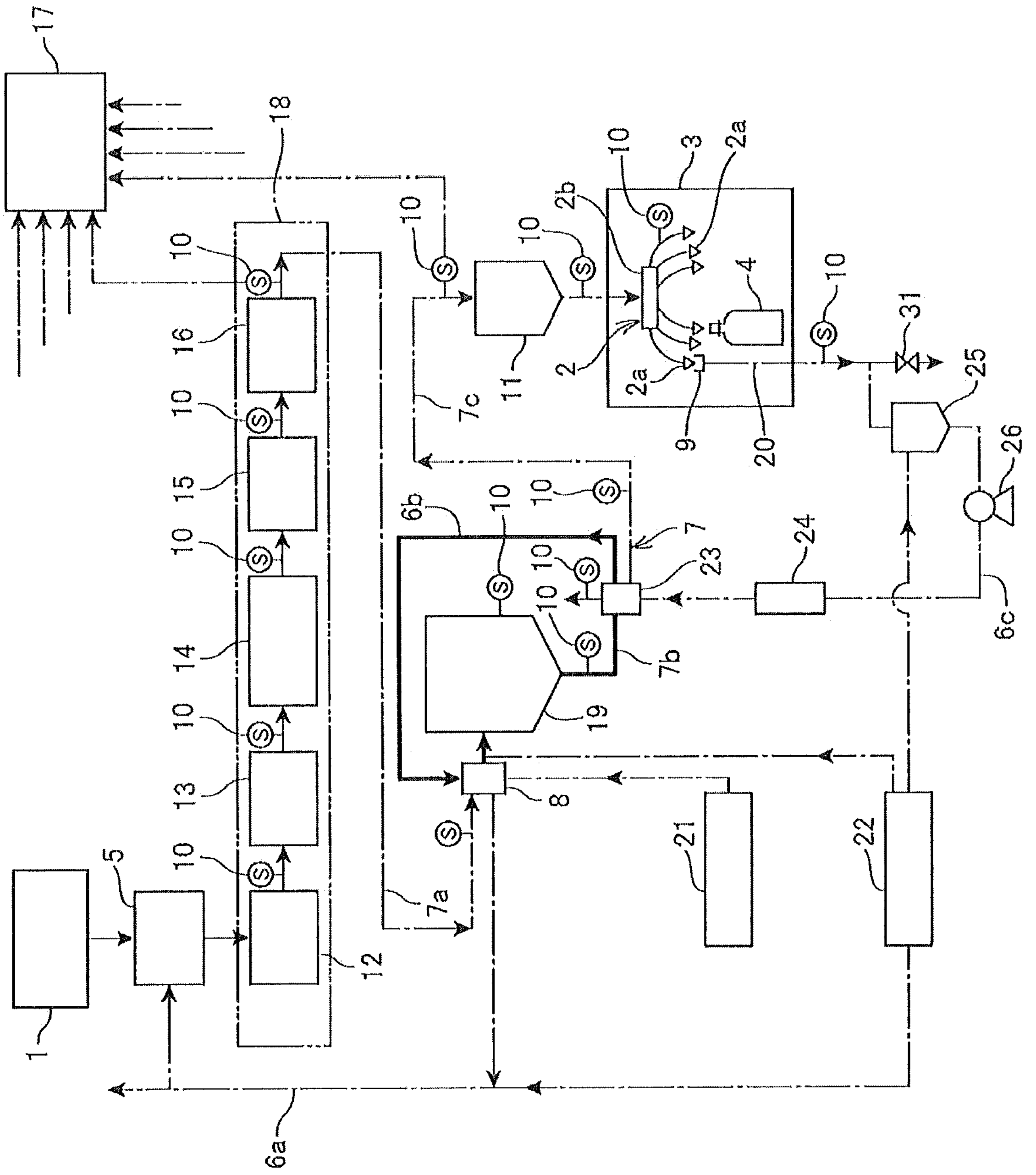
FIG. 3 is a block diagram showing the aseptic filling machine according to the embodiment of the present invention in a state where CIP and SIP of an aseptic surge tank piping portion including the aseptic surge tank are being performed.

As shown by the thick line in FIG. 3, the aseptic surge tank circulation path used for performing CIP, SIP or concurrent CIP and SIP of the aseptic surge tank piping portion 7*b* is formed by providing the aseptic surge tank piping portion 7*b* that extends from the upstream manifold valve 8 to the downstream manifold valve 23 via the aseptic surge tank 19 with the aseptic surge tank feedback path 6*b*.

Figure 4:
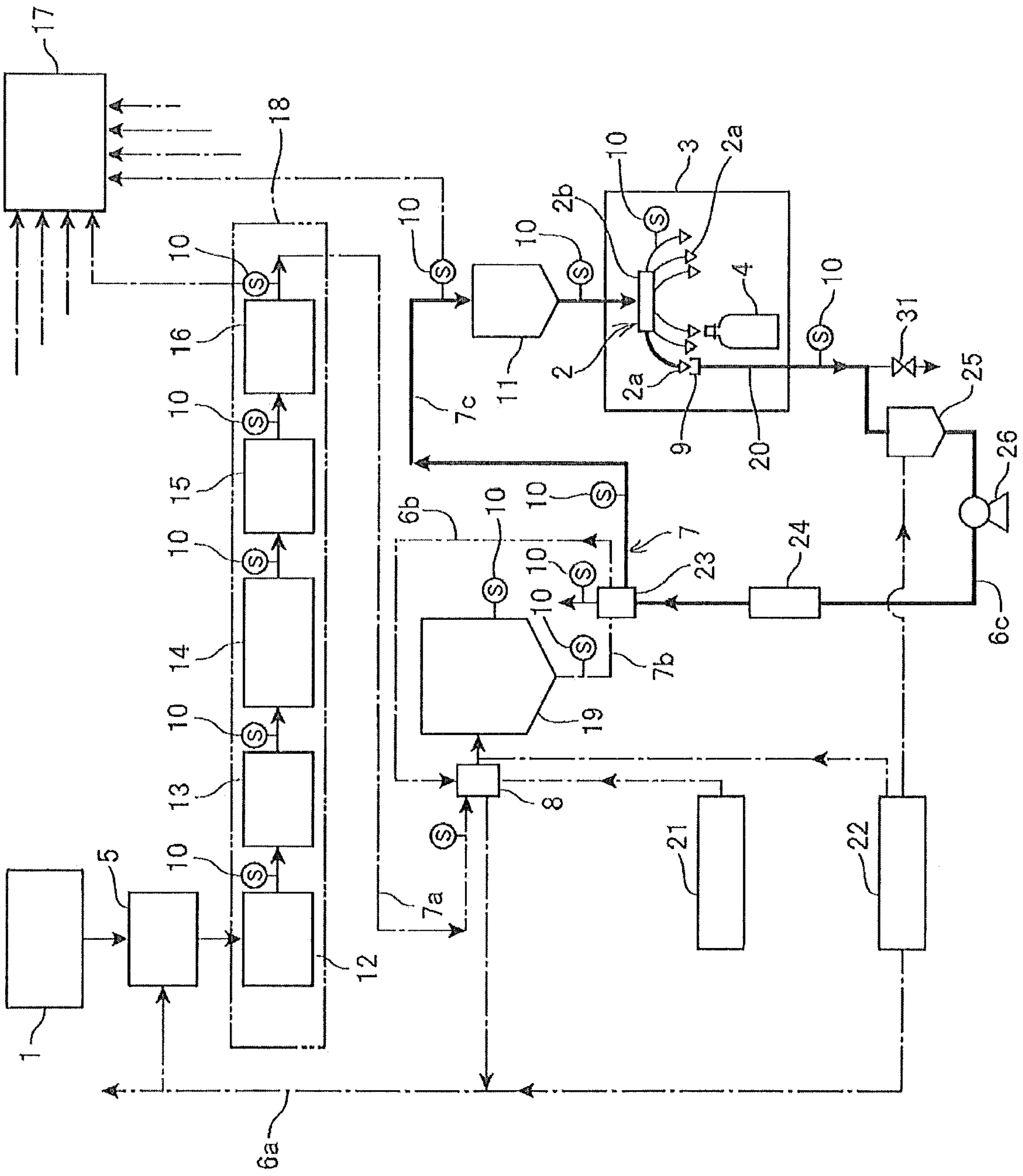
FIG. 4 is a block diagram showing the aseptic filling machine according to the embodiment of the present invention in a state where CIP and SIP of a downstream piping portion from a filler tank to filling nozzles are being performed.

As shown by the thick line in FIG. 4, the downstream circulation path used for performing CIP or SIP of the downstream piping portion 7*c* is formed by providing the downstream piping portion 7*c* that includes the manifold valve 23, the filler tank 11 and the filling nozzles 2*a* of the filler 2 with the downstream feedback path 6*c*.

Figure 11:
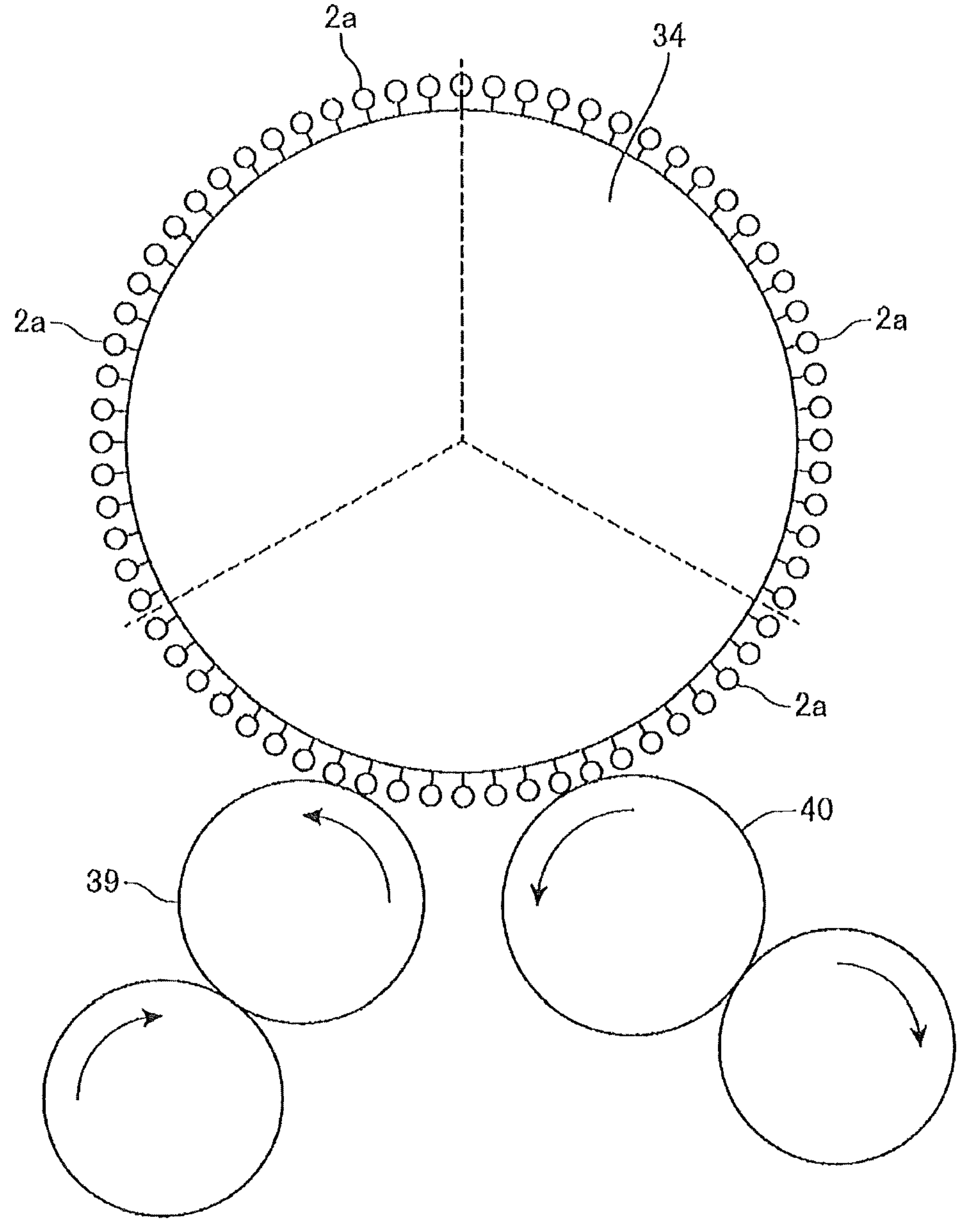
FIG. 11 is a diagram showing the filling nozzles of the aseptic filling machine according to the embodiment of the present invention divided into subsets.

As shown by the thick line in FIG. 4, the downstream piping portion 7*c* that includes the downstream manifold valve 23, the filler tank 11 and the filling nozzles 2*a* of the filler 2 is provided with the downstream feedback path 6*c*. In addition, as shown in FIG. 11, the filling nozzles 2*a* are divided into a plurality of subsets, and a divisional downstream circulation path is formed which extends from the filler tank 11 to the downstream manifold valve 23 via a subset of filling nozzles 2*a*. By flowing the cleaning liquid through the divisional downstream circulation path formed and circulating the cleaning liquid in the divisional downstream circulation path, CIP, SIP or concurrent CIP and SIP of the downstream piping portion 7*c* is performed.

Figure 7:
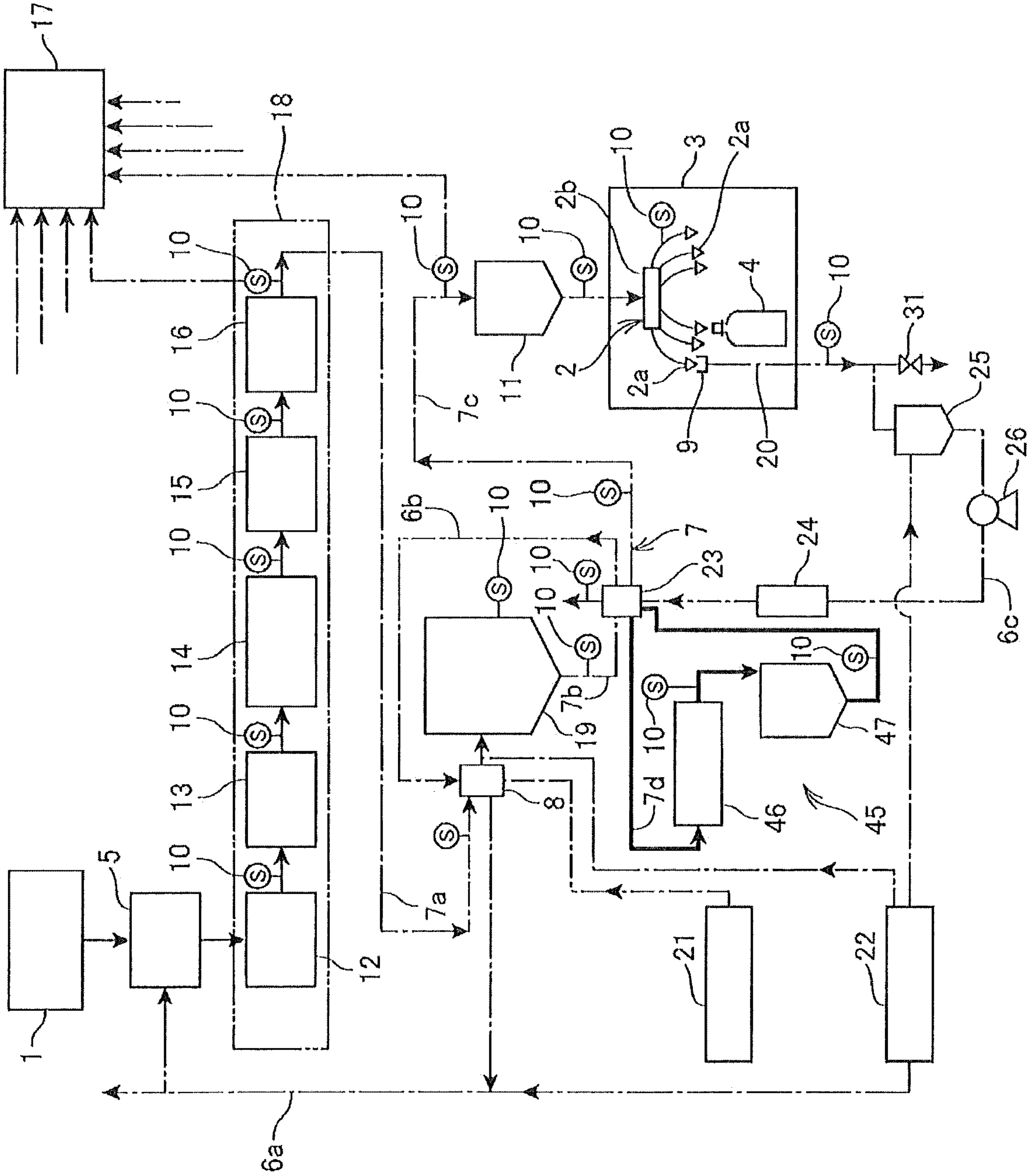
FIG. 7 is a block diagram showing the aseptic filling machine for a drink containing carbon dioxide gas according to the embodiment of the present invention in which CIP and SIP of a carbonating piping portion are being performed.

As shown by the thick line in FIG. 7, the carbonating piping portion 7*d* that extends from the downstream manifold valve 23 back to the downstream manifold valve 23 via the carbonating apparatus 46 and the carbonated drink surge tank 47 forms a circulation path, which serves as a circulation path used for performing CIP or SIP of the carbonating apparatus 46 and the carbonated drink surge tank 47 in the carbonating piping portion 45 or performing CIP and SIP of the carbonating apparatus 46 and the carbonated drink surge tank 47 in the carbonating piping portion 45.

FIG. 11 shows a state where a large number of filling nozzles 2*a* are arranged around the filler wheel 34, and the large number of filling nozzles 2*a* are divided. Divisional subsets of filling nozzles 2*a* are consecutively subjected to CIP, SIP or concurrent CIP and SIP. The bottles 4 are passed from a conveyor wheel 39 to the filler wheel 34. The bottle 4 is conveyed by a gripper arranged around each wheel holding a support ring provided below a mouth portion of the bottle 4. On the filler wheel 34, grippers are arranged at locations where the filling nozzles 2*a* are arranged. The bottles 4 filled with the drink are passed from the filler wheel 34 to a discharge wheel 40 and conveyed by the discharge wheel 40.

Figure 12:
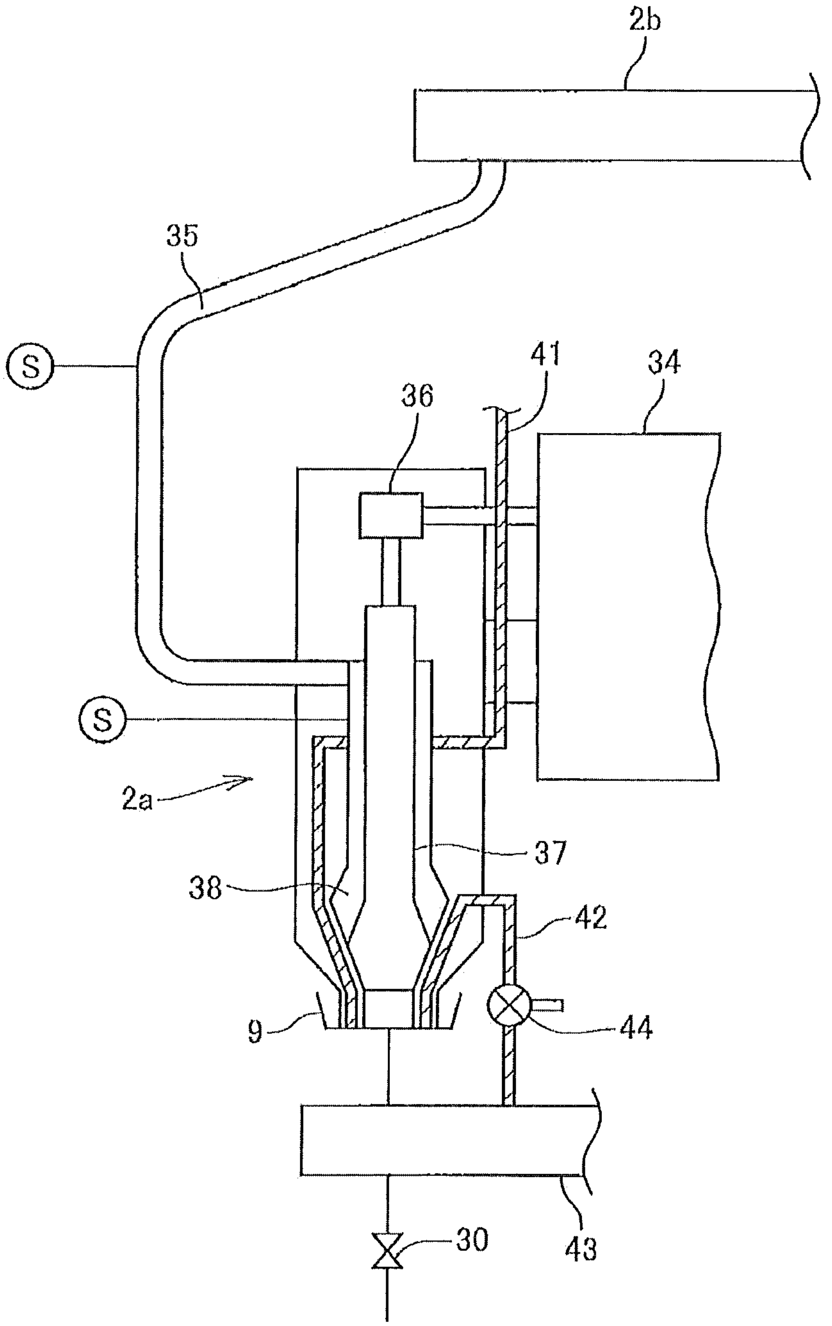
FIG. 12 is a diagram showing the filling nozzle of the aseptic filling machine according to the embodiment of the present invention.

Of the divided filling nozzles 2*a*, filling nozzles 2*a* used for flowing the cleaning liquid are opened by raising a rod 37 shown in FIG. 12, and filling nozzles 2*a* not used for flowing the cleaning liquid are closed by lowering the rod.

A cleaning liquid supply apparatus 22 that supplies the cleaning liquid required for performing CIP of the aseptic surge tank circulation path and the downstream circulation path, a heated steam supply apparatus 21 that supplies heated steam for performing SIP of the aseptic surge tank piping portion 7*b*, and an aseptic air supply apparatus that supplies aseptic air to the aseptic surge tank 19 are provided. Furthermore, a water supply apparatus or an aseptic water supply apparatus is provided which supplies water or aseptic water for washing away the cleaning liquid flowed in the upstream circulation path, the aseptic surge tank circulation path and the downstream circulation path. FIG. 9 shows an aseptic water supply apparatus 27 that supplies aseptic water to the downstream circulation path.

The upstream circulation path, the aseptic surge tank circulation path and the downstream circulation path are provided with a pump and a required valve for circulating the cleaning liquid or water. As shown in FIGS. 4 and 9, the downstream circulation path is provided with a downstream circulation pump 26. The downstream circulation path is also provided with the downstream storage tank 25 for storing the cleaning liquid or water to be circulated. The downstream storage tank 25 is supplied with aseptic air.

As shown in FIG. 1, temperature sensors 10 are arranged at locations on the upstream piping portion 7*a* including locations where the temperature is less likely to rise in SIP. The locations where the temperature sensors 10 are arranged include locations between components in the heat sterilization apparatus 18, the location of the outlet of the second-stage cooling portion 16 and the location before the upstream manifold valve 8 on the pipe line between the second-stage heating portion 13 in the heat sterilization apparatus 18 and the upstream manifold valve 8, for example. The temperature sensors 10 are arranged at these locations. Information on the temperatures measured by the temperature sensors 10 is transmitted to a controller 17.

As shown in FIG. 1, temperature sensors 10 are also arranged at locations on the aseptic surge tank piping portion 7*b* including locations where the temperature is less likely to rise in SIP. The locations where the temperature sensors 10 are arranged include locations in the aseptic surge tank 19, a location near the outlet of the aseptic surge tank 19 and a location near a drain for discharging heated steam when SIP is performed using heated steam. Information on the temperatures measured by the temperature sensors 10 is transmitted to the controller 17.

As shown in FIG. 1, temperature sensors 10 are also arranged at locations on the downstream piping portion 7*c* including locations where the temperature is less likely to rise in SIP. The locations where the temperature sensors 10 are arranged include locations at bends of the pipe line between the downstream manifold valve 23 and the filling nozzles 2*a*, locations near the inlet and outlet of the filler tank 11, locations between the filler manifold 2*b* and the filling nozzles 2*a* in the filler 2 and locations in the filling nozzles 2*a*, for example. The temperature sensors 10 are arranged at these locations on the pipe line. Information on the temperatures measured by the temperature sensors 10 is transmitted to the controller 17.

As shown in FIG. 6, temperature sensors 10 are also arranged at locations on the carbonating piping portion 45 including locations where the temperature is less likely to rise in SIP. The locations where the temperature is less likely to rise include locations in the carbonating apparatus 46, a location near the outlet of the carbonating apparatus 46, a location near the outlet of the carbonated drink surge tank 47 and locations at bends of the pipe line between the carbonated drink surge tank 47 and the downstream manifold valve 23, for example. The temperature sensors 10 are arranged at these locations on the pipe line. Information on the temperatures measured by the temperature sensors 10 is transmitted to the controller 17.

The balance tank 5, the aseptic surge tank 19, the carbonated drink surge tank 47, the filler tank 11 and the downstream storage tank 25 are preferably tanks in conformity with the first class pressure vessel capable of storing and flowing a heated fluid at temperatures higher than 100° C., since CIP or SIP of these tanks may be performed at a temperature higher than 100° C. The heated fluid referred to here is a heated cleaning liquid, water, air or steam. The water may be aseptic water, and the air may be aseptic air.

To perform CIP, SIP or concurrent CIP and SIP of the downstream piping portion 7*c*, cups 9 are arranged each of which can be connected to and disconnected from the opening of a filling nozzle 2*a* of the filler 2. When performing CIP or SIP, an actuator (not shown) couples each cup 9, which will form the starting end of the downstream feedback path 6*c*, to an opening portion at the tip end of a filling nozzle 2*a* of the filler 2, thereby connecting the cup 9 to the opening of the filling nozzle 2*a*.

When charging the carbonated drink, as shown in FIG. 12, the aseptic filling machine is provided with the carbon dioxide gas supply piping 41 that extends from the filler tank 11 to the filling nozzles 2*a*. The carbon dioxide gas supplied from the filler tank 11 may be distributed from a carbon dioxide gas supply manifold and supplied to the filling nozzles 2*a*. The outlet of the carbon dioxide gas supply piping 41 is included in the tip end of the filling nozzle 2*a*, and the carbon dioxide gas supply piping 41 is connected to the downstream circulation path by connecting the cup 9 to the tip end of the filling nozzle 2*a*. The carbon dioxide gas discharge piping 42 for discharging the carbon dioxide gas from the tip end of the filling nozzle 2*a* is also provided, and the carbon dioxide gas discharge piping 42 is connected to the downstream circulation path by connecting the carbon dioxide gas discharge piping 42 to a circulation manifold 43. The carbon dioxide gas discharge piping 42 may be gathered to a carbon dioxide gas discharge manifold and connected to the circulation manifold 43.

Typically, when filling the bottle 4 with the carbonated drink during operation of the aseptic filling machine, the carbon dioxide gas supplied from the carbon dioxide gas supply piping 41 is supplied to the bottle 4, and the carbon dioxide gas in the bottle 4 temporarily flows into the filler tank 11 when the bottle 4 is filled with the drink. After the bottle 4 is filled with the drink, any carbon dioxide gas remaining in the tip end of the filling nozzle 2*a* and the head space of the bottle 4 is discharged through the carbon dioxide gas discharge piping 42. When discharging the excess carbon dioxide gas, a three-way valve 44 provided in the middle of the carbon dioxide gas discharge piping 42 is operated to discharge the carbon dioxide gas into the filling portion chamber 3 before the carbon dioxide gas reaches the circulation manifold 43.

The drink supply piping 7 is provided with not only the upstream manifold valve 8, the downstream manifold valve 23, the heated steam supply apparatus 21, the cleaning liquid supply apparatus 22, the aseptic water supply apparatus 27, the aseptic air supply apparatus 28 and actuators (not shown) but also a pump for flowing a fluid, a valve for controlling the flow of a fluid and the like. These components are controlled by an output of the controller 17 shown in FIG. 1.

Next, a transition method from CIP to SIP in the cleaning and sterilizing method for the aseptic filling machine, a rinsing method and a drink product manufacturing process will be described with reference to FIG. 2 to FIG. 12.

(CIP)

When an operation button on a panel (not shown) of the controller 17 is operated, CIP of each of the upstream circulation path, the aseptic surge tank circulation path, the carbonating piping portion 45 and the downstream circulation path of the aseptic filling machine is performed in a predetermined procedure. To this end, the upstream manifold valve 8 and the downstream manifold valve 23 disconnect the upstream piping portion 7*a*, the aseptic surge tank piping portion 7*b*, the carbonating piping portion 45 and the downstream piping portion 7*c* from each other. CIP is performed by supplying the cleaning liquid from the cleaning liquid supply apparatus 22 to each circulation path and circulating the supplied cleaning liquid in the circulation path. By circulating the cleaning liquid, any residue of the drink flowed in the drink supply piping 7 in the previous operation of the aseptic filling machine is removed.

The cleaning liquid is an alkaline cleaning liquid containing water and an alkaline chemical agent as an additive such as caustic soda (sodium hydroxide), potassium hydroxide, sodium carbonate, sodium silicate, sodium phosphate, sodium hypochlorite, surfactant and a chelating agent (sequestering agent) such as sodium gluconate and ethylenediamine tetraacetic acid (EDTA), or an acidic cleaning liquid containing water and a nitric acid-based or phosphoric acid-based acidic chemical agent as an additive. The water can be any water containing no foreign matters, such as ion exchanged water, distilled water or tap water.

The alkaline cleaning liquid may contain lithium carbonate, ammonium carbonate, magnesium carbonate, calcium carbonate, propylene carbonate or a mixture thereof, although the alkaline cleaning liquid is not limited to these. The alkaline cleaning liquid may also contain a bicarbonate such as sodium bicarbonate, potassium bicarbonate, lithium bicarbonate, ammonium bicarbonate, magnesium bicarbonate or calcium bicarbonate, a sesquicarbonate such as a sodium sesquicarbonate, potassium sesquicarbonate or lithium sesquicarbonate, or a mixture thereof.

The acidic cleaning liquid may contain not only the nitric acid or phosphoric acid described above but also hydrochloric acid, sulfuric acid, acetic acid, citric acid, lactic acid, formic acid, glycolic acid, methanesulfonic acid, sulfamic acid, or a mixture thereof, although the acidic cleaning liquid is not limited to these.

The cleaning liquid may contain various bleaching agent such as hypochlorite, hydrogen peroxide, peracetic acid, peroctanoic acid, persulfate, perborate, hydrosulfite or thiourea dioxide, or percarbonate, for example. Furthermore, the cleaning liquid may contain a water softener such as aluminosilicate or polycarboxylate, or may contain an anti-redeposition agent such as sodium phosphate, sodium polyacrylate or sodium carboxylate. Furthermore, an enzyme, a solvent, fatty acid, a foam modifier or an active enzyme source may be added to the cleaning liquid, for example.

As cleaning liquids used in CIP, an alkaline cleaning liquid can be flowed first, and then an acidic cleaning liquid can be flowed, although the order of flowing cleaning liquids is not limited to this order. For example, an acidic cleaning liquid may be flowed first, and then an alkaline cleaning liquid may be flowed, or an acidic cleaning liquid and an alkaline cleaning liquid may be alternately flowed multiple times. Alternatively, only one of an acidic cleaning liquid and an alkaline cleaning liquid may be flowed for CIP.

CIP of the upstream circulation path is performed by circulating the cleaning liquid supplied from the cleaning liquid supply apparatus 22 in the upstream circulation path that passes through the balance tank 5, the heat sterilization apparatus 18 and the upstream manifold valve 8 provided on the upstream piping portion 7*a* of the drink supply piping 7, as shown by the solid line in FIG. 2. A fixed amount of cleaning liquid is constantly or intermittently supplied from the cleaning liquid supply apparatus 22, and the cleaning liquid removes any residue of the previous drink deposited on the inside of the upstream piping portion 7*a* while circulating in the upstream circulation path. To activate the cleaning liquid, the temperature of the cleaning liquid may be raised to a predetermined temperature by the heat sterilization apparatus 18 provided on the upstream piping portion 7*a*. The predetermined temperature is 60° C. to 140° C., and raising the temperature can improve the cleaning effect and produce the sterilizing effect. The cleaning liquid being circulated may be discharged to the outside of the machine as required. After the cleaning liquid is circulated in the upstream circulation path at a predetermined temperature for a predetermined time, water or aseptic water is supplied to the upstream circulation path to wash the cleaning liquid away. CIP is ended by washing the cleaning liquid away. CIP is controlled by the controller 17 from the start to the end thereof.

CIP of the aseptic surge tank circulation path is performed by circulating the cleaning liquid supplied from the cleaning liquid supply apparatus 22 in the aseptic surge tank circulation path that passes through the upstream manifold valve 8, the aseptic surge tank 19 and the downstream manifold valve 23 provided on the aseptic surge tank piping portion 7*b*, as shown by the solid line in FIG. 3. A fixed amount of cleaning liquid is constantly or intermittently supplied from the cleaning liquid supply apparatus 22, and the cleaning liquid removes any residue of the previous drink deposited on the inside of the aseptic surge tank piping portion 7*b* while circulating in the aseptic surge tank circulation path. To activate the cleaning liquid, the temperature of the cleaning liquid may be raised to a predetermined temperature by a heat exchanging apparatus provided on the aseptic surge tank piping portion 7*b*. The cleaning liquid being circulated may be discharged to the outside of the machine as required. After the cleaning liquid is circulated in the aseptic surge tank circulation path at a predetermined temperature for a predetermined time, water or aseptic water is supplied to the aseptic surge tank circulation path to wash the cleaning liquid away. CIP is ended by washing the cleaning liquid away. CIP is controlled by the controller 17 from the start to the end thereof.

The aseptic surge tank 19 has a large volume and therefore is difficult to fill with the cleaning liquid. Therefore, the cleaning liquid is sprayed to the inner surface of the aseptic surge tank 19. The cleaning liquid is sprayed with a rotary spray ball or the like provided in an upper part of the tank.

CIP of the carbonating piping portion 45 is performed by flowing the cleaning liquid supplied from the cleaning liquid supply apparatus 22 to the downstream manifold valve 23, the carbonating apparatus 46 and the carbonated drink surge tank 47 and circulating the cleaning liquid in the carbonating piping portion 45 forming a circulation path extending back to the downstream manifold valve 23, as shown by the thick line in FIG. 7. A fixed amount of cleaning liquid is constantly or intermittently supplied from the cleaning liquid supply apparatus 22, and the cleaning liquid removes any residue of the previous drink deposited on the inside of the carbonating piping portion 45 while circulating in the carbonating piping portion 45. To activate the cleaning liquid, the temperature of the cleaning liquid may be raised to a predetermined temperature by a heat exchanging apparatus provided on the carbonating piping portion 45. The cleaning liquid being circulated may be discharged to the outside of the machine as required. After the cleaning liquid is circulated in the carbonating piping portion 45 at a predetermined temperature for a predetermined time, water or aseptic water is supplied to the carbonating piping portion 45 to wash the cleaning liquid away. CIP is ended by washing the cleaning liquid away. CIP is controlled by the controller 17 from the start to the end thereof.

CIP of the downstream circulation path is performed by circulating the cleaning liquid supplied from the cleaning liquid supply apparatus 22 in the downstream circulation path that passes through the downstream manifold valve 23, the filler tank 11 and the filler 2 on the downstream piping portion 7*c*, as shown by the solid line in FIG. 4. A fixed amount of cleaning liquid is constantly or intermittently supplied from the cleaning liquid supply apparatus 22, and the cleaning liquid removes any residue of the previous drink deposited on the inside of the downstream piping portion 7*c* while circulating in the downstream circulation path. To activate the cleaning liquid, the temperature of the cleaning liquid may be raised to a predetermined temperature by a heat exchanging apparatus 24 provided on the downstream circulation path. The predetermined temperature is 60° C. to 140° C., and raising the temperature can improve the cleaning effect and produce the sterilizing effect. After the cleaning liquid is circulated in the downstream circulation path at a predetermined temperature for a predetermined time, water or aseptic water is supplied to the downstream circulation path to wash the cleaning liquid away. CIP is ended by washing the cleaning liquid away. CIP is controlled by the controller 17 from the start to the end thereof.

Before performing CIP of the downstream circulation path, the cups 9 are coupled to the opening portions of the filling nozzles 2*a* to connect drain tubes 20 connected to the downstream feedback path 6*c* to the filling nozzles 2*a*, thereby allowing the cleaning liquid to circulate through the downstream feedback path 6*c*. The drain tubes 20 for the filling nozzles 2*a* are connected to the circulation manifold 43 to collect the cleaning liquid.

As shown in FIG. 4, the cleaning liquid is circulated in the downstream circulation path by the downstream circulation pump 26. The cleaning liquid flows from the filling nozzles 2*a* to the downstream circulation pump 26 via the cups 9, the drain tubes 20 and the downstream storage tank 25, and is circulated by the downstream circulation pump 26. FIG. 9 shows details of the downstream circulation path. The cleaning liquid is stored in the downstream storage tank 25, and is circulated in the downstream circulation path by the downstream circulation pump 26. Piping provided with downstream circulation valves 29*a*, 29*b*, 29*c* and 29*d* is provided. By opening the downstream circulation valves 29*a* and 29*d* and closing the downstream circulation valves 29*b* and 29*c*, the cleaning liquid stored in the downstream storage tank 25 flows to the downstream circulation pump 26, and circulates back to the downstream circulation pump 26 via the heat exchanging apparatus 24, the valve 29*a*, the manifold valve 23, the filler tank 11, the filler 2, the filling nozzles 2*a*, the cups 9, the drain tubes 20, the valve 29*d* and the downstream storage tank 25.

Figure 10:
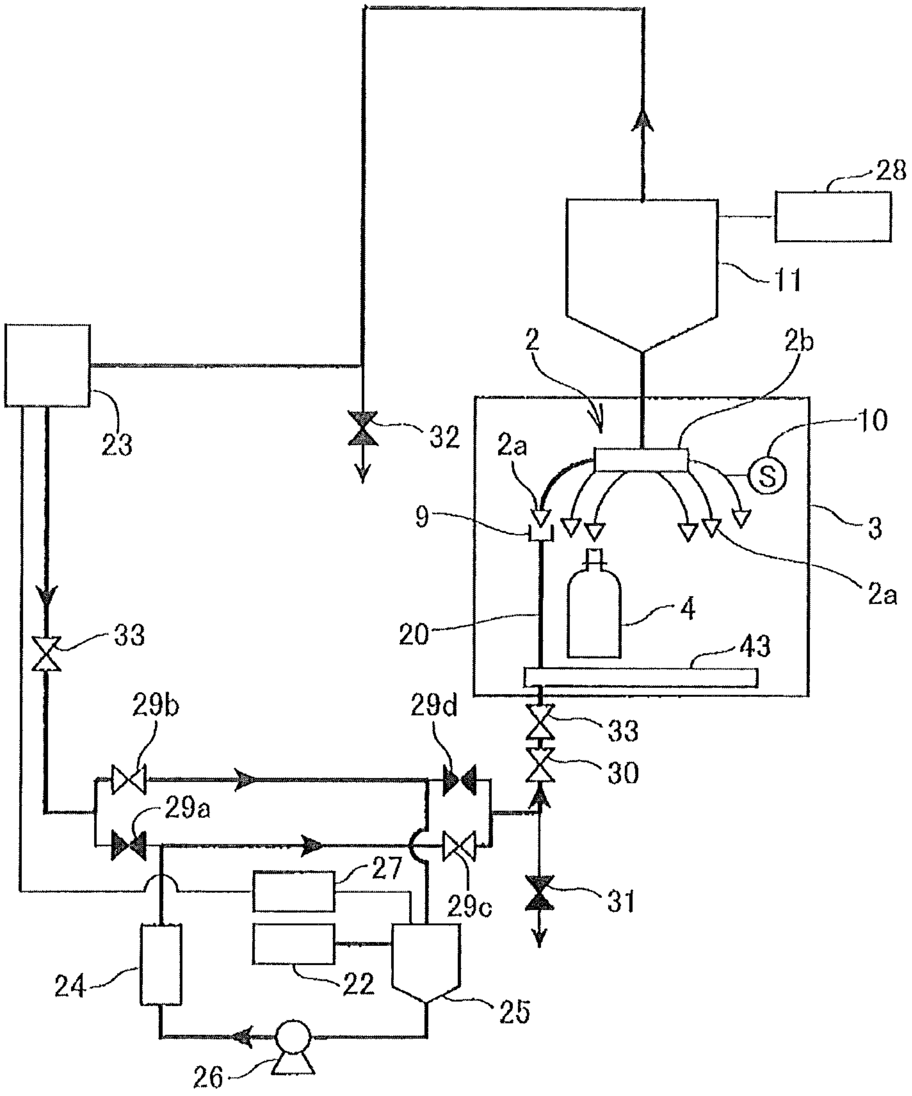
FIG. 10 is a detailed block diagram showing the aseptic filling machine according to the embodiment of the present invention in a state where CIP and SIP of the downstream piping portion from the filler tank to the divisional subset of filling nozzles are being performed by flowing a cleaning liquid in a reverse direction.

FIG. 10 shows a state where CIP of the downstream piping portion 7*c* from the filler tank 11 to the filling nozzles 2*a* is performed by flowing the cleaning liquid in the reverse direction to the direction in FIG. 9. The cleaning liquid is stored in the downstream storage tank 25, and circulated in the downstream circulation path by the downstream circulation pump 26. By opening the downstream circulation valves 29*b* and 29*c* and closing the downstream circulation valves 29*a* and 29*d*, the cleaning liquid stored in the downstream storage tank 25 circulates from the downstream circulation pump 26 back to the downstream circulation pump 26 via the heat exchanging apparatus 24, the valve 29*c*, the drain tubes 20, the cups 9, the filling nozzles 2*a*, the filler 2, the filler tank 11, the manifold valve 23, the valve 29*b* and the downstream storage tank 25.

The direction of the flow in FIG. 9 is the flow direction of the drink when filling the bottles with the drink, and this direction is referred to a forward flow direction. CIP is performed by flowing the cleaning liquid in this direction. However, in parts of the downstream piping portion 7*c* where the drink tends to remain, especially the filling valves, a residue of the drink may be unable to be completely removed by CIP in the forward flow direction. In such a case, the residue of the drink remaining after CIP in the forward flow direction may be able to be completely removed by flowing the cleaning liquid in the reverse direction as shown in FIG. 10. When the drink remains after CIP in the forward flow direction, CIP can be performed by flowing the cleaning liquid in the downstream circulation path in a reverse flow direction. The cleaning liquid is flowed in the forward flow direction and then in the reverse flow direction, and this process may be repeatedly performed. CIP in the forward flow direction alone takes a long time to remove the residue in the filling nozzles 2*a*. However, the residue can be removed in a shorter time by flowing the cleaning liquid in the reverse flow direction.

The large number of filling nozzles 2*a* are divided into a plurality of subsets, and the cleaning liquid may be flowed to a divisional subset of filling nozzles 2*a*. Although FIG. 11 shows a state where the filling nozzles 2*a* are divided into three subsets, the filling nozzles 2*a* can be divided into any plurality of subsets. The filling nozzles 2*a* are preferably divided into two to five subsets. If the filling nozzles 2*a* are divided into six or more subsets, CIP will take longer.

The cleaning liquid flows to a divisional subset of filling nozzles 2*a* when each of the filling nozzles 2*a* is opened by raising the rod 37 shown in FIG. 12. The filling nozzles 2*a* to which the cleaning liquid is not to be flowed are closed by lowering the rod 37.

As shown by the solid line in FIG. 4, the cleaning liquid is circulated in the downstream circulation path by the downstream circulation pump 26. The cleaning liquid flows from the downstream manifold valve 23 to the downstream circulation pump 26 via the filler tank 11, the filler manifold 2*b*, the divisional subsets of filling nozzles 2*a*, the cups 9, the drain tubes 20, the circulation manifold 43 and the downstream storage tank 25, and is circulated by the downstream circulation pump 26.

FIG. 9 shows details of the downstream circulation path. The cleaning liquid is supplied from the cleaning liquid supply apparatus 22 and stored in the downstream storage tank 25. The cleaning liquid stored in the downstream storage tank 25 is circulated in the downstream circulation path by the downstream circulation pump 26. Piping provided with the downstream circulation valves 29*a*, 29*b*, 29*c* and 29*d* is provided. By opening the downstream circulation valves 29*a* and 29*d* and closing the downstream circulation valves 29*b* and 29*c*, the cleaning liquid stored in the downstream storage tank 25 flows to the downstream circulation pump 26, and circulates back to the downstream circulation pump 26 via the heat exchanging apparatus 24, the valve 29*a*, the downstream manifold valve 23, the filler tank 11, the filler manifold 2*b*, the divisional subset of filling nozzles 2*a*, the cups 9, the drain tubes 20, the circulation manifold 43, the valve 29*d* and the downstream storage tank 25.

FIG. 10 shows a state where CIP of the downstream piping portion 7*c* from the filler tank 11 to the filling nozzles 2*a* is performed by flowing the cleaning liquid in the reverse direction to the direction in FIG. 9. The cleaning liquid is stored in the downstream storage tank 25, and circulated in the downstream circulation path by the downstream circulation pump 26. By opening the downstream circulation valves 29*b* and 29*c* and closing the downstream circulation valves 29*a* and 29*d*, the cleaning liquid stored in the downstream storage tank 25 circulates from the downstream circulation pump 26 back to the downstream circulation pump 26 via the heat exchanging apparatus 24, the valve 29*c*, the circulation manifold 43, the drain tubes 20, the cups 9, the divisional subset of filling nozzles 2*a*, the filler manifold 2*b*, the filler tank 11, the downstream manifold valve 23, the valve 29*b* and the downstream storage tank 25.

The direction of the flow in FIG. 9 is the flow direction of the drink when filling the bottles 4 with the drink, and this direction is referred to a forward flow direction. CIP is performed by flowing the cleaning liquid in this direction. However, in parts of the downstream piping portion 7*c* where the drink tends to remain, especially the filling nozzles 2*a*, a residue of the drink may be unable to be completely removed by CIP in the forward flow direction. In such a case, the residue of the drink remaining after CIP in the forward flow direction may be able to be completely removed by flowing the cleaning liquid in the reverse direction as shown in FIG. 10. Not only CIP in the forward flow direction but also CIP in which the cleaning liquid is flowed in the downstream circulation path in the reverse flow direction is performed. The cleaning liquid is flowed in the forward flow direction and then in the reverse flow direction, and this process may be repeatedly performed. CIP in the forward flow direction alone takes a long time to remove the residue in the divisional subset of filling nozzles 2*a*. However, the residue can be removed in a shorter time by flowing the cleaning liquid in the reverse flow direction.

The cleaning liquid is circulated in the downstream circulation path including the divisional subset of filling nozzles 2*a* in the forward flow direction and the reverse flow direction for a predetermined time, and then CIP of the divisional subset of filling nozzles 2*a* is ended. The divisional subset of filling nozzles 2*a* CIP of which has been ended are closed, another divisional subset of filling nozzles 2*a* are opened to form a downstream circulation path including the other divisional subset of filling nozzles 2*a*, and the cleaning liquid is circulated in the downstream circulation path in the forward flow direction and the reverse flow direction for a predetermined time. After that, CIP of the downstream circulation paths including other divisional subsets of filling nozzles 2*a* are sequentially performed.

FIG. 12 shows the filling nozzle 2*a*. The filling nozzle 2*a* is arranged around the filler wheel 34. The filler manifold 2*b* and the filling nozzle 2*a* are connected by a drink supply pipe 35, and the drink is supplied from the filler manifold 2*b* to the filling nozzle 2*a* through the drink supply pipe 35. When the rod 37 is raised by a switching piston 36, the drink supplied to the filling nozzle 2*a* flows between the inner surface of a filling liquid flow pipe 38 and the rod 37 and flows out of the tip end of the filling nozzle 2*a* opened. When flowing the cleaning liquid in the forward flow direction or reverse flow direction, the rod 37 in the filling nozzle 2*a* is at a raised position, and the cleaning liquid flows in the filling nozzle 2*a* in the forward or reverse direction. The cleaning liquid flowing in the forward or reverse direction removes any residue deposited on the inside of the drink supply pipe 35, the outer wall of the rod 37 and the inner wall of the filling liquid flow pipe 38.

The filling nozzle 2*a* for charging the carbonated drink is provided with the carbon dioxide gas supply piping 41 for supplying the carbon dioxide gas and the carbon dioxide gas discharge piping 42 for discharging the carbon dioxide gas. When flowing the cleaning liquid in the downstream circulation path, the cleaning liquid is also flowed to the carbon dioxide gas supply piping 41 and the carbon dioxide gas discharge piping 42. The cleaning liquid may be flowed, at the same time, to the carbon dioxide gas supply piping 41 and the carbon dioxide gas discharge piping 42 of the divisional subset of filling nozzles 2*a* to which the cleaning liquid is flowed. The cleaning liquid may be flowed to the carbon dioxide gas supply piping 41 and the carbon dioxide gas discharge piping 42 of a subset of filling nozzles 2*a* to which the cleaning liquid is not flowed. In that case, the filling nozzle 2*a* is closed, and valves of the carbon dioxide gas supply piping 41 and the carbon dioxide gas discharge piping 42 are opened.

The carbon dioxide gas supply piping 41 is provided between the filler tank 11 and the filling nozzle 2*a*, and therefore, the cleaning liquid can be flowed in the forward or reverse direction in the carbon dioxide gas supply piping 41. A carbon dioxide gas supply manifold is provided between the filler tank 11 and the filling nozzle 2*a*. In the carbon dioxide gas discharge piping 42, the cleaning liquid can be flowed in the forward or reverse direction between the filling nozzle 2*a* and the circulation manifold 43. A carbon dioxide gas discharge manifold is provided between the filling nozzle 2*a* and the circulation manifold 43.

(SIP)

After CIP ends, SIP of each of the upstream piping portion 7*a*, the aseptic surge tank piping portion 7*b*, the carbonating piping portion 45 and the downstream piping portion 7*c* is performed in a predetermined procedure. In SIP, as in CIP, the upstream piping portion 7*a*, the aseptic surge tank piping portion 7*b*, the carbonating piping portion 45 and the downstream piping portion 7*c* are disconnected from each other by the upstream manifold valve 8 and the downstream manifold valve 23. SIP of the upstream piping portion 7*a*, the aseptic surge tank piping portion 7*b*, the carbonating piping portion 45 and the downstream piping portion 7*c* can be performed in parallel. SIP can be performed in parallel with CIP of any piping portion. SIP of the inside of the upstream manifold valve 8 and the downstream manifold valve 23 using heated steam is performed at the same time as SIP of the upstream piping portion 7*a*, the aseptic surge tank piping portion 7*b*, the carbonating piping portion 45 and the downstream piping portion 7*c*.

A case where SIP of the upstream piping portion 7*a* is performed will be described. While the liquid feeding pumps used for CIP are not stopped, and the cleaning liquid used for CIP is kept circulating in the upstream circulation path, the cleaning liquid is heated to a required temperature for SIP by the heat sterilization apparatus 18, and SIP is performed with the heated cleaning liquid at a higher temperature circulating in the upstream circulation path. In this process, since the liquid feeding pumps are not stopped, the set temperature of the heat sterilization apparatus 18 raised in CIP is not lowered but raised to a temperature for SIP, and therefore, the temperature of the inside of the upstream piping portion 7*a* including the heat sterilization apparatus 18 does not decrease in the transition from CIP to SIP.

The cleaning liquid may be heated to the required temperature for SIP by the heat sterilization apparatus 18 while keeping the cleaning liquid used for CIP circulating after the end of CIP. Alternatively, the cleaning liquid may be heated to the required temperature for SIP at the start of CIP, and CIP and SIP may be performed at the same time.

SIP of the upstream piping portion 7*a* may be performed by introducing water from the balance tank 5 on the upstream circulation path to wash the cleaning liquid used for CIP away from the inside of the upstream circulation path, heating the water to a required temperature for SIP in the heat sterilization apparatus 18, and circulating the heated water in the upstream circulation path.

When the heated cleaning liquid or water is flowing in the upstream circulation path, the measured temperature is transmitted at regular time intervals to the controller 17 from the temperature sensors 10 arranged at different locations on the upstream piping portion 7*a*.

When pH of the drink that is a product liquid to be charged into the bottles 4 is equal to or higher than 4.6, sterilization temperature conditions may be determined, provided that the reference temperature Tr is 121.1° C., and the Z value is 10° C. The last cleaning liquid used for CIP or the water used for washing the cleaning liquid away is heated to the required temperature for SIP by the heat sterilization apparatus 18, and when the temperatures at different locations on the upstream piping portion 7*a* reach 121.1° C., the controller 17 starts calculating the F value at each location. The calculation is performed according to the following formula.

$$F=\int_{t_0}^{t_1} 10^{(T-121.1)/10}dt \quad \text{[formula 1]}$$

where T represents an arbitrary sterilization temperature (° C.), and $10^{(T-121.1)/10}$ represents a reduction rate at the arbitrary temperature T and corresponds to the heating time (minutes) at 121.1° C. In this term, 121.1 represents the reference temperature (° C.), and 10 represents the Z value (° C.).

When the minimum F value of the F values calculated according to the above formula reaches a target value, the sterilization of the upstream piping portion 7*a* is completed. The sterilization method is not limited to the method in which the sterilization is completed based on the F value calculated, and when to complete the sterilization may be determined in a known conventional method using temperature and time, for example.

When the minimum value of the calculated F values reaches the target value, it is determined that the sterilization of the upstream piping portion 7*a* is completed, and SIP is ended. Alternatively, however, the minimum value may be selected from the temperatures measured by the temperature sensors 10 arranged at each location on the upstream piping portion 7*a*, the F values calculated based on the minimum values may be accumulated, and it may be determined to complete the sterilization when the accumulated F value reaches a target value. The accumulation apparatus can be simplified compared with the case where the F value is calculated for all the measured temperatures.

In the formula for calculating the F value, the reference temperature Tr and the Z value can be changed depending on the kind of the drink that is the product liquid. For example, when pH of the product liquid is equal to or higher than 4 and lower than 4.6, the reference temperature Tr may be set at 85° C., and the Z value may be set at 7.8° C. When pH of the product liquid is lower than 4, the reference temperature Tr may be set at 65° C., and the Z value may be set at 5° C. That is, the values to be substituted into the formula described above can be changed as appropriate according to the ease of development of microorganisms, the temperature during distribution or the like of the product liquid such as green tea, mineral water or a chilled drink. Therefore, the required temperature for SIP varies with the kind of the next drink to be charged into bottles. Therefore, concerning the transition from the CIP process to the SIP process, CIP may be performed at a higher temperature than SIP.

A case where SIP of the aseptic surge tank piping portion 7*b* is performed will be described. While the liquid feeding pumps used for CIP are not stopped, and the cleaning liquid used for CIP is kept circulating in the aseptic surge tank circulation path, the cleaning liquid is heated to a required temperature for SIP by the heat exchanging apparatus, and SIP is performed with the heated cleaning liquid at a higher temperature circulating in the aseptic surge tank circulation path. When the rotary spray ball is used for spraying the cleaning liquid, SIP of the aseptic surge tank piping portion 7*b* is performed by heating the cleaning liquid to be sprayed to the required temperature for SIP and spraying the cleaning liquid into the aseptic surge tank 19.

The cleaning liquid may be heated to the required temperature for SIP by the heat exchanging apparatus while keeping the cleaning liquid used for CIP circulating after the end of CIP. Alternatively, the cleaning liquid may be heated to the required temperature for SIP at the start of CIP, and CIP and SIP may be performed at the same time.

SIP of the aseptic surge tank piping portion 7*b* may be performed by introducing water from the aseptic water supply apparatus to wash the cleaning liquid used for CIP away from the inside of the aseptic surge tank circulation path, heating the water to the required temperature for SIP in the heat exchanging apparatus, and circulating the heated water in the aseptic surge tank circulation path.

SIP may be performed by flowing heated steam in the aseptic surge tank piping portion 7*b*. By performing SIP of the aseptic surge tank piping portion 7*b* using heated steam, any cleaning liquid remaining in the aseptic surge tank piping portion 7*b* is washed away. The cleaning liquid remaining in the aseptic surge tank feedback path 6*b* may be washed away by flowing heated steam from the aseptic surge tank piping portion 7*b* to the aseptic surge tank feedback path 6*b* in an early stage of SIP.

The heated steam is supplied from the heated steam supply apparatus 21 to the upstream manifold valve 8, the heated steam supplied to the upstream manifold valve 8 is supplied to the aseptic surge tank 19, and the heated steam supplied to the aseptic surge tank 19 is discharged from a steam drain via the downstream manifold valve 23. The heated steam supplied is produced by heating and vaporizing water containing no foreign matters, such as ion exchanged water, distilled water or tap water. Although the heated steam is typically at 121.1° C. or higher, the heated steam may be at 100° C. or higher. The water may be directly heated and vaporized, or indirectly heated and vaporized using steam produced by a boiler as a heat source.

When performing SIP of the inside of the aseptic surge tank piping portion 7*b*, the measured temperature is transmitted at regular time intervals to the controller 17 from the temperature sensors 10 arranged at different locations on the aseptic surge tank piping portion 7*b*.

When pH of the drink that is a product liquid to be charged into the bottles 4 is equal to or higher than 4.6, sterilization temperature conditions may be determined, provided that the reference temperature Tr is 121.1° C., and the Z value is 10° C. When the temperatures at different locations on the aseptic surge tank piping portion 7*b* reach 121.1° C., the controller 17 starts calculating the F value at each location according to the formula 1 described above.

When the minimum F value of the F values calculated according to the formula reaches a target value, the sterilization of the aseptic surge tank piping portion 7*b* is completed, and SIP is ended. As described above, the sterilization method is not limited to the method in which the sterilization is completed based on the F value calculated, and when to complete the sterilization may be determined in a known conventional method using temperature and time, for example.

When the minimum value of the calculated F values reaches the target value, the sterilization of the aseptic surge tank piping portion 7*b* is completed. Alternatively, however, the minimum value may be selected from the temperatures measured by the temperature sensors 10 arranged at each location on the aseptic surge tank piping portion 7*b*, the F values calculated based on the minimum values may be accumulated, and it may be determined to complete the sterilization when the accumulated F value reaches a target value. The accumulation apparatus can be simplified compared with the case where the F value is calculated for all the measured temperatures.

In the formula for calculating the F value described above, the reference temperature Tr and the Z value can be changed depending on the kind of the drink that is the product liquid. For example, when pH of the product liquid is equal to or higher than 4 and lower than 4.6, the reference temperature Tr may be set at 85° C., and the Z value may be set at 7.8° C. When pH of the product liquid is lower than 4, the reference temperature Tr may be set at 65° C., and the Z value may be set at 5° C. That is, the values to be substituted into the formula described above can be changed as appropriate according to the ease of development of microorganisms, the temperature during distribution or the like of the product liquid such as green tea, mineral water or a chilled drink. Therefore, the required temperature for SIP varies with the kind of the next drink to be charged into bottles.

A case where SIP of the carbonating piping portion 45 is performed will be described. While the liquid feeding pumps used for CIP are not stopped, and the cleaning liquid used for CIP is kept circulating in the carbonating piping portion 45, the cleaning liquid is heated to a required temperature for SIP by the heat exchanging apparatus, and SIP is performed with the heated cleaning liquid at a higher temperature circulating in the carbonating piping portion 45.

The cleaning liquid may be heated to the required temperature for SIP by the heat exchanging apparatus while keeping the cleaning liquid used for CIP circulating after the end of CIP. Alternatively, the cleaning liquid may be heated to the required temperature for SIP at the start of CIP, and CIP and SIP may be performed at the same time.

SIP of the carbonating piping portion 45 may be performed by introducing water from the aseptic water supply apparatus to wash the cleaning liquid used for CIP away from the inside of the carbonating piping portion 45, heating the water to the required temperature for SIP in the heat exchanging apparatus, and circulating the heated water in the carbonating piping portion 45.

SIP may be performed by flowing heated steam in the carbonating piping portion 45. By performing SIP of the carbonating piping portion 45 using heated steam, any cleaning liquid remaining in the carbonating piping portion 45 is washed away. The cleaning liquid remaining in the carbonating piping portion 45 may be washed away by flowing heated steam to the carbonating piping portion 45 in an early stage of SIP.

When performing SIP of the inside of the carbonating piping portion 45, the measured temperature is transmitted at regular time intervals to the controller 17 from the temperature sensors 10 arranged at different locations on the carbonating piping portion 45.

When pH of the drink that is a product liquid to be charged into the bottles 4 is equal to or higher than 4.6, sterilization temperature conditions may be determined, provided that the reference temperature Tr is 121.1° C., and the Z value is 10° C. When the temperatures at different locations on the aseptic surge tank piping portion 7*b* reach 121.1° C., the controller 17 starts calculating the F value at each location according to the formula 1 described above.

When the minimum F value of the F values calculated according to the formula reaches a target value, the sterilization of the carbonating piping portion 45 is completed, and SIP is ended. As described above, the sterilization method is not limited to the method in which the sterilization is completed based on the F value calculated, and when to complete the sterilization may be determined in a known conventional method using temperature and time, for example.

When the minimum value of the calculated F values reaches the target value, the sterilization of the carbonating piping portion 45 is completed. Alternatively, however, the minimum value may be selected from the temperatures measured by the temperature sensors 10 arranged at each location on the carbonating piping portion 45, the F values calculated based on the minimum values may be accumulated, and it may be determined to complete the sterilization when the accumulated F value reaches a target value. The accumulation apparatus can be simplified compared with the case where the F value is calculated for all the measured temperatures.

In the formula for calculating the F value described above, the reference temperature Tr and the Z value can be changed depending on the kind of the drink that is the product liquid. For example, when pH of the product liquid is equal to or higher than 4 and lower than 4.6, the reference temperature Tr may be set at 85° C., and the Z value may be set at 7.8° C. When pH of the product liquid is lower than 4, the reference temperature Tr may be set at 65° C., and the Z value may be set at 5° C. That is, the values to be substituted into the formula described above can be changed as appropriate according to the ease of development of microorganisms, the temperature during distribution or the like of the product liquid such as green tea, mineral water or a chilled drink. Therefore, the required temperature for SIP varies with the kind of the next drink to be charged into bottles.

Next, a case where SIP of the downstream piping portion 7*c* is performed will be described. While the downstream circulation pump 26 used for CIP is not stopped, and the cleaning liquid used for CIP is kept circulating in the downstream circulation path, the cleaning liquid is heated to a required temperature for SIP by the heat exchanging apparatus 24 provided on the downstream feedback path 6*c*, and SIP is performed with the heated cleaning liquid circulating in the downstream circulation path. In this process, since the downstream circulation pump 26 is not stopped, the temperature in the downstream piping portion 7*c* raised in CIP is not lowered, and the cleaning liquid is heated to the required temperature for SIP, the temperature of the inside of the downstream piping portion 7*c* including the filler 2 does not decrease in the transition from CIP to SIP.

As described above, CIP may be performed by flowing the cleaning liquid in the forward flow direction and then in the reverse flow direction. The cleaning liquid may be heated to the required temperature for SIP and may be flowed in the reverse direction in SIP.

The cleaning liquid may be heated to the required temperature for SIP by the heat exchanging apparatus 24 while keeping the cleaning liquid used for CIP circulating after the end of CIP. Alternatively, the cleaning liquid may be heated to the required temperature for SIP at the start of CIP, and CIP and SIP may be performed at the same time. The cleaning liquid heated to the required temperature for SIP may be flowed in the reverse flow direction. The effect of CIP is improved if the cleaning liquid heated to the required temperature for SIP is flowed in the forward flow direction and then flowed in the reverse flow direction. The effect of SIP is improved since the cleaning effect is improved compared with the case where the cleaning liquid is flowed only in the forward flow direction, and the residue can be completely removed.

Aseptic water is supplied from the aseptic water supply apparatus 27 shown in FIG. 9 to the downstream storage tank 25 on the downstream circulation path, the cleaning liquid in the downstream circulation path is washed away by the supplied aseptic water, and the cleaning liquid washed away is discharged through a discharge valve 31 connected to the drain tubes 20.

After that, SIP of the downstream piping portion 7*c* may be performed by heating the aseptic water to the required temperature for SIP in the heat exchanging apparatus 24 and circulating the heated aseptic water in the downstream circulation path. The aseptic water supplied to the downstream storage tank 25 on the downstream circulation path is heated and sterilized in the heat exchanging apparatus 24, and therefore, water that is not sterilized may be used instead of the aseptic water as far as a required sterilization value for the product is achieved. The heated aseptic water may be flowed in the reverse flow direction. The effect of SIP is the same as when the aseptic water is flowed in the forward flow direction.

When the cleaning liquid is flowing in the downstream circulation path, the measured temperature is transmitted at regular time intervals to the controller 17 from the temperature sensors 10 arranged at different locations on the downstream piping portion 7*c* including the filling nozzles 2*a*.

When pH of the drink that is a product liquid to be charged into the bottles 4 is equal to or higher than 4.6, sterilization temperature conditions may be determined, provided that the reference temperature Tr is 121.1° C., and the Z value is 10° C. The last cleaning liquid used for CIP is heated to the required temperature for SIP by the heat exchanging apparatus 24, and when the temperatures at different locations on the downstream piping portion 7*c* reach 121.1° C., the controller 17 starts calculating the F value at each location according to the formula 1 described above.

When the minimum F value of the F values calculated according to the formula reaches a target value, the sterilization of the downstream piping portion 7*c* is completed, and SIP is ended. As described above, the sterilization method is not limited to the method in which the sterilization is completed based on the F value calculated, and when to complete the sterilization may be determined in a known conventional method using temperature and time, for example.

When the minimum value of the calculated F values reaches the target value, the sterilization of the downstream piping portion 7*c* is completed. Alternatively, however, the minimum value may be selected from the temperatures measured by the temperature sensors 10 arranged at each location on the downstream piping portion 7*c*, the F values calculated based on the minimum values may be accumulated, and it may be determined to complete the sterilization when the accumulated F value reaches a target value. The accumulation apparatus can be simplified compared with the case where the F value is calculated for all the measured temperatures.

In the formula for calculating the F value described above, the reference temperature Tr and the Z value can be changed depending on the kind of the drink that is the product liquid. For example, when pH of the product liquid is equal to or higher than 4 and lower than 4.6, the reference temperature Tr may be set at 85° C., and the Z value may be set at 7.8° C. When pH of the product liquid is lower than 4, the reference temperature Tr may be set at 65° C., and the Z value may be set at 5° C. That is, the values to be substituted into the formula described above can be changed as appropriate according to the ease of development of microorganisms, the temperature during distribution or the like of the product liquid such as green tea, mineral water or a chilled drink. Therefore, the required temperature for SIP varies with the kind of the next drink to be charged into bottles. Therefore, concerning the transition from the CIP process to the SIP process, CIP may be performed at a higher temperature than SIP.

Furthermore, SIP of the downstream piping portion 7*c* including a divisional subset of filling nozzles 2*a* will be described. While the downstream circulation pump 26 used for CIP of the downstream piping portion 7*c* including the divisional subset of filling nozzles 2*a* is not stopped, and the cleaning liquid used for CIP of the divisional subset of filling nozzles 2*a* is kept circulating in the downstream circulation path, the cleaning liquid is heated to a required temperature for SIP of the divisional subset of filling nozzles 2*a* by the heat exchanging apparatus 24 provided on the downstream feedback path 6*c*, and SIP of the downstream piping portion 7*c* including the divisional subset of filling nozzles 2*a* is performed with the cleaning liquid circulating in the downstream circulation path. In this process, since the downstream circulation pump 26 is not stopped, the temperature in the downstream piping portion 7*c* raised in CIP of the downstream piping portion 7*c* including the divisional subset of filling nozzles 2*a* is not lowered, and the cleaning liquid is heated to the required temperature for SIP of the downstream piping portion 7*c* including the divisional subset of filling nozzles 2*a*, the temperature of the inside of the downstream piping portion 7*c* including the filler 2 does not decrease in the transition from CIP of the divisional subset of filling nozzles 2*a* to SIP of the divisional subset of filling nozzles 2*a*.

As described above, CIP of the downstream circulation path formed including the divisional subset of filling nozzles 2*a* may be performed by flowing the cleaning liquid in the forward flow direction and then in the reverse flow direction. The cleaning liquid may be heated to the required temperature for SIP of the downstream piping portion 7*c* including the divisional subset of filling nozzles 2*a* and may be flowed in the reverse direction in SIP of the downstream piping portion 7*c* including the divisional subset of filling nozzles 2*a*.

The cleaning liquid may be heated to the required temperature for SIP of the downstream piping portion 7*c* including the divisional subset of filling nozzles 2*a* by the heat exchanging apparatus 24 while keeping the cleaning liquid used for CIP circulating after the end of CIP of the downstream piping portion 7*c* including the divisional subset of filling nozzles 2*a*. Alternatively, the cleaning liquid may be heated to the required temperature for SIP of the downstream piping portion 7*c* including the divisional subset of filling nozzles 2*a* at the start of CIP of the downstream piping portion 7*c* including the divisional subset of filling nozzles 2*a*, and CIP of the downstream piping portion 7*c* including the divisional subset of filling nozzles 2*a* and SIP of the downstream piping portion 7*c* including the divisional subset of filling nozzles 2*a* may be performed at the same time. The cleaning liquid heated to the required temperature for SIP of the downstream piping portion 7*c* including the divisional subset of filling nozzles 2*a* may be flowed in the reverse flow direction. The effect of CIP is improved if the cleaning liquid heated to the required temperature for SIP of the downstream piping portion 7*c* including the divisional subset of filling nozzles 2*a* is flowed in the forward flow direction and then flowed in the reverse flow direction. The effect of SIP is improved since the cleaning effect is improved compared with the case where the cleaning liquid is flowed only in the forward flow direction, and the residue can be completely removed.

The time required for CIP and SIP can be reduced by raising the temperature of the cleaning liquid flowed to the downstream circulation path including the divisional subset of filling nozzles 2*a* for CIP to the required temperature for SIP and performing CIP and SIP in sequence or at the same time. Furthermore, by flowing the cleaning liquid for SIP in the reverse direction from the filling nozzles 2*a* to the filler tank 11, the sterilization effect can be improved since the cleaning effect is improved and the residue can be completely removed.

Aseptic water is supplied from the aseptic water supply apparatus 27 shown in FIG. 9 to the downstream storage tank 25 on the downstream circulation path, the cleaning liquid in the downstream circulation path including the divisional subset of filling nozzles 2*a* is washed away by the supplied aseptic water, and the cleaning liquid washed away is discharged through the discharge valve 31 via the circulation manifold 43 connected to the drain tubes 20.

After that, SIP of the downstream piping portion 7*c* including the divisional subset of filling nozzles 2*a* may be performed by heating the aseptic water to the required temperature for SIP in the heat exchanging apparatus 24 and circulating the heated aseptic water in the downstream circulation path. The aseptic water supplied to the downstream storage tank 25 on the downstream circulation path is heated and sterilized in the heat exchanging apparatus 24, and therefore, water that is not sterilized may be used instead of the aseptic water as far as a required sterilization value for the product is achieved. The heated aseptic water may be flowed in the reverse flow direction. The effect of SIP is the same as when the aseptic water is flowed in the forward flow direction.

When the cleaning liquid is flowing in the downstream circulation path, the measured temperature is transmitted at regular time intervals to the controller 17 from the temperature sensors 10 arranged at different locations on the downstream piping portion 7*c* including the filling nozzles 2*a*.

When pH of the drink that is a product liquid to be charged into the bottles 4 is equal to or higher than 4.6, sterilization temperature conditions may be determined, provided that the reference temperature Tr is 121.1° C., and the Z value is 10° C. The last cleaning liquid used for CIP is heated to the required temperature for SIP by the heat exchanging apparatus 24, and when the temperatures at different locations on the downstream piping portion 7*c* including the divisional subset of filling nozzles 2*a* reach 121.1° C., the controller 17 starts calculating the F value at each location according to the formula 1 described above.

When the minimum F value of the F values calculated according to the formula reaches a target value, the sterilization of the downstream piping portion 7*c* including the divisional subset of filling nozzles 2*a* is completed, and SIP is ended. As described above, the sterilization method is not limited to the method in which the sterilization is completed based on the F value calculated, and when to complete the sterilization may be determined in a known conventional method using temperature and time, for example.

When the minimum value of the calculated F values reaches the target value, the sterilization of the downstream piping portion 7*c* including the divisional subset of filling nozzles 2*a* is completed. Alternatively, however, the minimum value may be selected from the temperatures measured by the temperature sensors 10 arranged at each location on the downstream piping portion 7*c* including the divisional subset of filling nozzles 2*a*, the F values calculated based on the minimum values may be accumulated, and it may be determined to complete the sterilization when the accumulated F value reaches a target value. The accumulation apparatus can be simplified compared with the case where the F value is calculated for all the measured temperatures.

In the formula for calculating the F value described above, the reference temperature Tr and the Z value can be changed depending on the kind of the drink that is the product liquid. For example, when pH of the product liquid is equal to or higher than 4 and lower than 4.6, the reference temperature Tr may be set at 85° C., and the Z value may be set at 7.8° C. When pH of the product liquid is lower than 4, the reference temperature Tr may be set at 65° C., and the Z value may be set at 5° C. That is, the values to be substituted into the formula described above can be changed as appropriate according to the ease of development of microorganisms, the temperature during distribution or the like of the product liquid such as green tea, mineral water or a chilled drink. Therefore, the required temperature for SIP varies with the kind of the next drink to be charged into bottles. Therefore, concerning the transition from the CIP process to the SIP process, CIP may be performed at a higher temperature than SIP.

The cleaning liquid heated to the required temperature for SIP is circulated in the downstream circulation path including the divisional subset of filling nozzles 2*a* in the forward flow direction or the reverse flow direction until a predetermined time elapses or the minimum F value reaches a target value, and then SIP of the divisional subset of filling nozzles 2*a* is ended. By lowering the rods 37, the divisional subset of filling nozzles 2*a* SIP of which has been ended are closed. Another divisional subset of filling nozzles 2*a* are opened by raising the rods 37, and the cleaning liquid heated to the required temperature for SIP is circulated in the downstream circulation path including the other divisional subset of filling nozzles 2*a* in the forward flow direction or the reverse flow direction. After that, the downstream circulation paths including other divisional subset of filling nozzles 2*a* are subjected to SIP in sequence.

The filling nozzle 2*a* for charging the carbonated drink is provided with the carbon dioxide gas supply piping 41 for supplying the carbon dioxide gas and the carbon dioxide gas discharge piping 42 for discharging the carbon dioxide gas. When flowing the cleaning liquid in the downstream circulation path, the cleaning liquid is also flowed to the carbon dioxide gas supply piping 41 and the carbon dioxide gas discharge piping 42. The cleaning liquid heated to the required temperature for SIP may be flowed, at the same time, to the carbon dioxide gas supply piping 41 and the carbon dioxide gas discharge piping 42 of the divisional subset of filling nozzles 2*a* to which the cleaning liquid is flowed. The cleaning liquid heated to the required temperature for SIP may be flowed to the carbon dioxide gas supply piping 41 and the carbon dioxide gas discharge piping 42 of a subset of filling nozzles 2*a* to which the cleaning liquid is not flowed. In that case, the filling nozzle 2*a* is closed, and valves of the carbon dioxide gas supply piping 41 and the carbon dioxide gas discharge piping 42 are opened.

The carbon dioxide gas supply piping 41 is provided between the filler tank 11 and the filling nozzle 2*a*, and therefore, the cleaning liquid heated to the required temperature for SIP can be flowed in the forward or reverse direction in the carbon dioxide gas supply piping 41. The carbon dioxide gas discharge piping 42 is provided between the filling nozzle 2*a* and the circulation manifold 43, and therefore, the cleaning liquid heated to the required temperature for SIP can be flowed in the forward or reverse direction in the carbon dioxide gas discharge piping 42.

(Rinsing)

After SIP is completed, the cleaning liquid used for SIP is discharged from the upstream circulation path, and rinsing is performed in which any cleaning liquid remaining in the upstream piping portion 7*a* and the upstream feedback path 6*a* is washed away by aseptic water. Water supplied to the balance tank 5 is heated by the heat sterilization apparatus 18 to produce aseptic water, and the produced aseptic water is flowed to and discharged from the upstream circulation path to wash the cleaning liquid away. In this process, the cleaning liquid is washed away while cooling the produced aseptic water in the holding tube 14 by flowing a coolant to the first-stage cooling portion 15 and the second-stage cooling portion 16 of the heat sterilization apparatus 18. The cooling can be started at any point in time after the end of SIP. When SIP is performed by heating the cleaning liquid to the required temperature for SIP, the cleaning liquid is cooled while being circulated. When SIP is performed by washing the cleaning liquid away after CIP, heating water to the required temperature for SIP and circulating the heated water, the water is cooled while being circulated.

As required, a heat exchanger may be provided between the balance tank 5 and the heat sterilization apparatus 18 or at a location upstream of the balance tank 5. In rinsing of the inside of the upstream piping portion 7*a*, heat may be exchanged between the cleaning liquid used for CIP or SIP of the inside of the upstream piping portion 7*a* or water used for rinsing of the inside of the upstream piping portion 7*a* heated by the heat sterilization apparatus 18 and ordinary water or pure water at a lower temperature supplied from the balance tank 5 to the heat sterilization apparatus 18, thereby raising the temperature of the ordinary water or pure water supplied from the balance tank 5 to reduce the load on the heat sterilization apparatus 18 when raising the temperature of the ordinary water or pure water and thereby improving the thermal efficiency.

The production of the aseptic water by the heat sterilization apparatus 18 is performed by supplying ordinary water or pure water to the balance tank 5 and heat sterilization the ordinary water or pure water under a sterilization condition that is equivalent to or stricter than the sterilization condition for the next drink to be charged in the heat sterilization apparatus 18. Since the production condition for the aseptic water conforms to the sterilization condition for the next drink to be charged, the sterilization condition of the heat sterilization apparatus 18 stabilizes while the rinsing is performed, and if cooling of the aseptic surge tank piping portion 7*b* and the downstream piping portion 7*c* is completed when the rinsing ends, the drink can be immediately sterilized to manufacture the products.

Immediately after the start of rinsing, the first-stage heating portion 12 and the second-stage heating portion 13 of the heat sterilization apparatus 18 have been heating the cleaning liquid for SIP of the upstream circulation path and therefore can heat the ordinary water or pure water to the set temperature. On the other hand, the first-stage cooling portion 15 and the second-stage cooling portion 16 have not been operating, and the flow path has been under the temperature condition for SIP, so that it takes a time to stabilize cooling. However, cooling stabilizes while rinsing is performed. After the cleaning liquid is completely removed, the rinsing process can be ended, the drink for the next product can be immediately sterilized, cooled and charged into the bottles 4.

Rinsing of any cleaning liquid used for CIP remaining in the aseptic surge tank circulation path can be performed using the heated aseptic water or heated steam used for SIP, as described above. When rinsing of the aseptic surge tank circulation path using only the heated aseptic water or heated steam is insufficient, aseptic water produced by the heat sterilization apparatus 18 can be used for rinsing of the aseptic surge tank circulation path. Rinsing of the upstream circulation path may be first performed, SIP of the aseptic surge tank circulation path may then be performed while keeping the aseptic water used for the rinsing circulating, and after the SIP of the aseptic surge tank circulation path ends, the upstream piping portion 7*a* and the aseptic surge tank piping portion 7*b* may be connected by the upstream manifold valve 8 to flow the aseptic water produced by the heat sterilization apparatus 18 to the aseptic surge tank circulation path, thereby rinsing the aseptic surge tank circulation path.

When SIP is performed using the cleaning liquid used for CIP, rinsing is performed by flowing aseptic water.

Cooling of the aseptic surge tank piping portion 7*b* after the end of SIP is performed by supplying aseptic air. After the temperature of the aseptic surge tank piping portion 7*b* is decreased to a temperature lower than 100° C. by supplying aseptic air, a coolant such as water may be supplied to a jacket of the aseptic surge tank 19 to cool the aseptic surge tank 19 in parallel with the cooling by supplying aseptic air. The aseptic surge tank piping portion 7*b* may be cooled by flowing aseptic water or the product thereto.

Rinsing of any cleaning liquid used for CIP remaining in the carbonating piping portion 45 can be performed using the heated aseptic water or heated steam used for SIP, as described above. When rinsing of the carbonating piping portion 45 using only the heated aseptic water or heated steam is insufficient, aseptic water produced by the heat sterilization apparatus 18 can be used for rinsing of the carbonating piping portion 45. Rinsing of the upstream circulation path and the aseptic surge tank circulation path may be first performed, SIP of the carbonating piping portion 45 may then be performed, and after the SIP of the carbonating piping portion 45 ends, the upstream piping portion 7*a* and the carbonating piping portion 45 may be connected by the downstream manifold valve 23 via the aseptic surge tank piping portion to flow the aseptic water produced by the heat sterilization apparatus 18 to the carbonating piping portion 45, thereby rinsing the carbonating piping portion 45.

When SIP is performed using the cleaning liquid used for CIP, rinsing is performed by flowing aseptic water.

Cooling of the carbonating piping portion 45 after the end of SIP is performed by supplying aseptic air. After the temperature of the carbonating piping portion 45 is decreased to a temperature lower than 100° C. by supplying aseptic air, aseptic water may be flowed to the carbonating piping portion 45 in parallel with the aseptic air to cool the carbonating piping portion 45.

With the carbonating piping portion 45, the aseptic water can be further cooled (to 1 to 5° C.) with chiller water to completely remove any residual heat after SIP, thereby suppressing foaming due to the carbon dioxide gas used in the filling.

While the downstream circulation pump 26 used for CIP of the downstream circulation path is not stopped, and the cleaning liquid used for CIP is kept circulating in the downstream circulation path, the cleaning liquid is heated to a required temperature for SIP by the heat exchanging apparatus 24 provided on the downstream feedback path 6*c*, SIP of the downstream circulation path is performed with the heated cleaning liquid circulating in the downstream circulation path, and then the cleaning liquid is cooled. The cooling is achieved by flowing a coolant to the heat exchanging apparatus 24. The heat exchanging apparatus 24 heats the cleaning liquid by flowing a heating medium, and cools the cleaning liquid by flowing a coolant. When cooling a cleaning liquid heated to a temperature equal to or higher than 100° C., such as 140° C., if the temperature of the inside of the downstream circulation path sealed is lower than 100° C., the pressure in the downstream circulation path is lower than the atmospheric pressure of the outside air, and the outside air pressure exerts a load on the piping and may cause damage to the piping.

It is possible to prevent the pressure in the downstream circulation path from becoming lower than the atmospheric pressure by supplying aseptic air to the filler tank 11. However, the aseptic air has to be supplied when the pressure in the downstream circulation path is higher than the atmospheric pressure, and if aseptic air is supplied from the aseptic air supply apparatus 28 to the filler tank 11 by opening a valve (not shown) to this end, droplets of the cleaning liquid or vaporized constituents of the cleaning liquid may flow into the valve of the aseptic air supply apparatus. The cleaning liquid or constituents of the cleaning liquid deposited on the aseptic air supply piping or the valve may be mixed with the drink and therefore has to be washed away. It is possible to supply heated steam and rinse the cleaning liquid or constituents of the cleaning liquid deposited on the aseptic air supply piping or the valve away with a condensate of the heated steam. Alternatively, it is also possible to directly supply heated steam to raise the pressure. However, these approaches are not easy and will complicate the machine.

As shown in FIG. 9, a backpressure valve 30 is provided in the path from the drain tubes 20 of the downstream feedback path 6*c* to the downstream storage tank 25. Although the backpressure valve 30 can be provided at any location in the downstream feedback path 6*c*, the location of the backpressure valve 30 is preferably close to the filler, since the pressure on the upstream side of the backpressure valve 30 is equal to or higher than the atmospheric pressure. When CIP or SIP is being performed, the backpressure valve 30 is fully open. After SIP is completed, when the temperature is lowered while keeping the cleaning liquid circulating, the volume of the liquid circulating in the piping decreases, and the pressure rapidly decreases. When the temperature is lowered to a temperature higher than 100° C. in the vicinity of 100° C., such as 105° C., the backpressure valve 30 is regulated to raise the pressure in the downstream circulation path. When the temperature decreases from the temperature higher than 100° C. to a temperature lower than 100° C., the backpressure is further raised to prevent the pressure in the downstream circulation path from becoming lower than the atmospheric pressure. The temperature continues being lowered, and when the temperature becomes lower than 90° C., aseptic air is supplied to the filler tank 11 or any part of the downstream piping portion 7*c* to keep the pressure in the downstream circulation path to be equal to or higher than the atmospheric pressure. When the temperature is lower than 90° C., the cleaning liquid or constituents of the cleaning liquid does not flow into the aseptic air supply piping, in which the aseptic air is supplied under pressure.

Depending on the amount of the liquid remaining in the downstream feedback path 6*c* and the downstream piping portion 7*c* and the extent of the temperature decrease, when the pressure in the piping cannot be made equal to or higher than the atmospheric pressure by the backpressure valve 30, heated steam may be supplied into the piping to raise the pressure in the downstream circulation path. The pressure of the heated steam is 0.05 to 0.5 MPa, or preferably 0.1 to 0.3 MPa. In this case, as described above, the difficulty of cleaning of the heated steam supply valve after the supply of the heated steam increases, and therefore, the heated steam supply valve is preferably provided in the downstream feedback path 6*c* where the product liquid does not flow (not shown).

After the temperature of the cleaning liquid in the downstream circulation path is lowered to a temperature lower than 100° C., or preferably a temperature lower than 90° C., the cleaning liquid is washed away. Aseptic water is supplied from the aseptic water supply apparatus 27 to the manifold valve 23, the supplied aseptic water is flowed to the downstream circulation path, and the cleaning liquid is discharged from the discharge valve 31 via the backpressure valve 30 and washed away. Aseptic water produced by the heat sterilization apparatus 18 may be used. When washing the cleaning liquid with the aseptic water, the pressure is regulated with the backpressure valve 30 to prevent the pressure in the filler tank 11 from being equal to or lower than the atmospheric pressure due to the temperature in the filler tank 11 lowering below 100° C. Rinsing of the upstream circulation path may be first performed, SIP of the downstream circulation path may then be performed while keeping the aseptic water circulating in the upstream circulation path, and after the SIP of the downstream circulation path ends, the upstream piping portion 7*a* and the downstream piping portion 7*c* may be connected via the aseptic surge tank piping portion 7*b* to flow the aseptic water produced by the heat sterilization apparatus 18 to the downstream circulation path, thereby rinsing the downstream circulation path.

The temperature of the cleaning liquid may be lowered while flowing the cleaning liquid in the reverse flow direction. In this process, a reverse-flow backpressure valve 33 is provided between the manifold valve 23 and the downstream storage tank 25 as shown in FIG. 10. When CIP or SIP is being performed by flowing the cleaning liquid in the reverse flow direction, the reverse-flow backpressure valve 33 is fully open. After SIP is completed, when the temperature is lowered while keeping the cleaning liquid circulating, the volume of the liquid circulating in the piping decreases, and the pressure rapidly decreases. When the temperature is lowered to a temperature higher than 100° C. in the vicinity of 100° C., such as 105° C., the reverse-flow backpressure valve 33 is regulated to raise the pressure in the downstream circulation path. When the temperature decreases from the temperature higher than 100° C. to a temperature lower than 100° C., the backpressure is further raised to prevent the pressure in the downstream circulation path from becoming lower than the atmospheric pressure. The temperature continues being lowered, and when the temperature becomes lower than 90° C., aseptic air is supplied to the filler tank 11 or any part of the downstream piping portion 7*c* to keep the pressure in the downstream circulation path to be equal to or higher than the atmospheric pressure.

After SIP of both the upstream piping portion 7*a* and the aseptic surge tank piping portion 7*b* connected to the upstream manifold valve 8 ends, SIP of the steam barrier of the upstream manifold valve 8 ends, and the upstream manifold valve 8 is cooled by the aseptic air and enters a waiting state. Similarly, after SIP of the aseptic surge tank piping portion 7*b*, the carbonating piping portion 45 and the downstream piping portion 7*c* ends, SIP of the steam barrier of the downstream manifold valve 23 ends, and the downstream manifold valve 23 is cooled by the aseptic air and enters a waiting state (not shown).

After SIP using the cleaning liquid that serves also as CIP is performed, and the inside of the downstream circulation path is cooled to a temperature lower than 100° C., aseptic water is preferably supplied from the manifold valve 23. This is because the cleaning liquid remaining in the downstream piping portion 7*c* can be rinsed while maintaining the aseptic condition of the downstream piping portion 7*c* without passing the aseptic water through the downstream feedback path 6*c*, which can be non-sterile because of the influx of the outside air after SIP. The supplied aseptic water passes. through the manifold valve 23, the filler tank 11, the filling nozzles 2*a* and the drain tubes 20 and is discharged from the discharge valve 31. In this process, the backpressure valve 30 or a valve near the backpressure valve 30 is closed. A cleaner densimeter (not shown) is provided upstream of the discharge valve 31. When the cleaner densimeter ceases detecting the concentration of the cleaner, it is determined that the cleaner in the piping has been removed, the rinsing process is ended, and the discharge valve 31 is closed. Instead of the densimeter, a conductivity meter may be provided, and it may be determined that the rinsing has ended when the conductivity of the rinse water becomes equal to or lower than 10 μS/cm, which is the value of the conductivity of pure water. In case the conductivity meter may fail, two conductivity meters may be provided, and the rinsing process may be automatically ended when both the two conductivity meters indicate the conductivity of pure water.

When the cleaning liquid in the upstream circulation path, the aseptic surge tank circulation path, the carbonating piping portion 45 and the downstream circulation path is removed with the aseptic water, and the cleaning liquid in all the filling nozzles 2*a* of the filler 2 is replaced with the aseptic water, the feeding of the aseptic water is stopped. At the same time, or after that, aseptic air supplied from the aseptic air supply apparatus 28 is blown into the filler tank 11 and the filling nozzles 2*a* to remove any aseptic water remaining in the downstream piping portion 7*c* and at the same time supply the aseptic air into the drink supply piping 7, thereby maintaining the positive pressure and thus the aseptic condition in the drink supply piping 7. When it is difficult to discharge the aseptic water in the drink supply piping 7, the drink may be fed to the drink supply piping 7, and only any thinned drink may be discharged from the filler 2 before starting the manufacture. After the rinsing is completed, the cup 9 is removed from the opening of each filling nozzle 2*a* by an actuator (not shown).

Any remaining water in the part of the downstream piping portion 7*c* upstream of the filler tank 11 is blown by opening a remaining water blow valve 32 provided on the downstream piping portion 7*c* shown in FIG. 9 and supplying aseptic air from the aseptic air supply apparatus 28 to the downstream piping portion 7*c*. Before opening the remaining water blow valve 32, if SIP of the part downstream of the remaining water blow valve 32 is performed using heated steam, introduction of bacteria can be prevented when the remaining water blow valve 32 is opened. The SIP of the part downstream of the remaining water blow valve 32 using heated steam can be performed under any condition as far as the sterilization value is equal to or higher than the sterilization value for the product liquid. If a pressure gauge is provided on the part of the downstream piping portion 7*c* between the downstream manifold valve 23 and the filler 2, and the opening, the closing and the degree of opening of the remaining water blow valve 32 is regulated while monitoring the indicated value of the pressure gauge in the remaining water blowing process, the remaining water can be quickly removed while preventing contamination by bacteria. The monitored pressure is equal to or higher than the atmospheric pressure, or preferably equal to or higher than 0.01 MPa. Any water still remaining in the downstream piping portion 7*c* and any remaining water in the filler tank 11 and filling nozzles 2*a* are blown while maintaining the aseptic condition in the filling portion chamber 3. After that, the drink is received, and the manufacture is started. If the manufacture is started without performing the remaining water blow, the drink is thinned at the start of the manufacture, and the yield decreases.

The downstream piping portion 7*c* including a divisional subset of filling nozzles 2*a* of the downstream circulation path is rinsed in the same manner as in the case where the filling nozzles 2*a* are not divided into subsets.

The filling nozzle 2*a* for charging the carbonated drink is provided with the carbon dioxide gas supply piping 41 for supplying carbon dioxide gas and the carbon dioxide gas discharge piping 42 for discharging carbon dioxide gas. When flowing the rinse water in the downstream circulation path, the rinse water is also flowed in the carbon dioxide gas supply piping 41 and the carbon dioxide gas discharge piping 42.

(CIP, SIP, Rinsing and Cooling of Downstream Piping Portion)

CIP, SIP and the rinsing process have been described above. Next, CIP, SIP, rinsing and cooling of the downstream piping portion 7*c* will be specifically described together.

Figure 13:
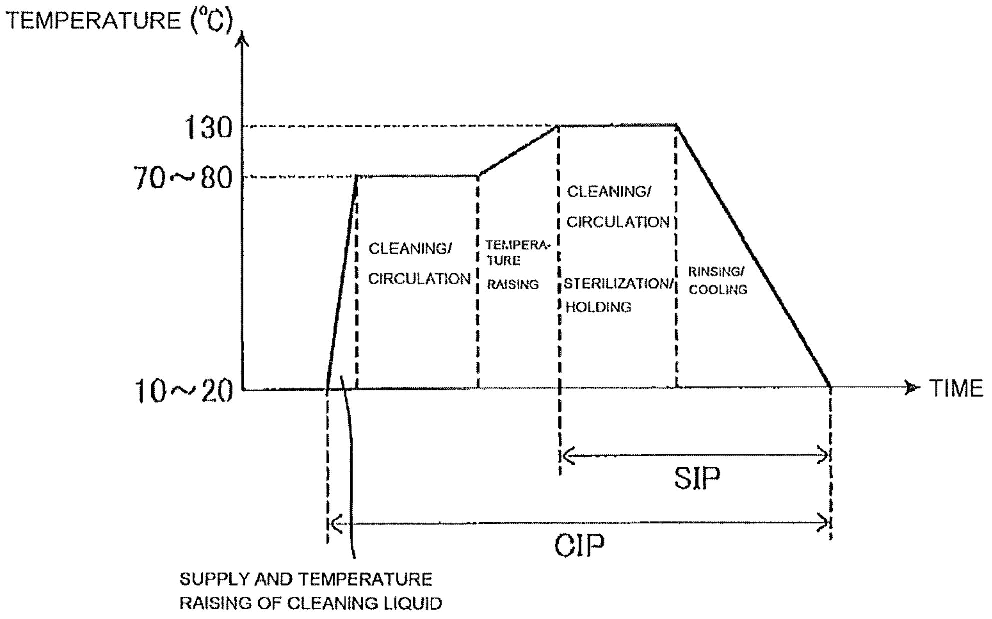
FIG. 13 is a graph showing the temperature of the filling nozzle when SIP of the downstream piping portion of the aseptic filling machine according to the embodiment of the present invention using the cleaning liquid is started in the course of CIP of the downstream piping portion.

FIG. 13 is a graph showing the temperature of the filling nozzle 2*a* when SIP of the downstream piping portion 7*c* of the aseptic filling machine using the cleaning liquid is started in the course of CIP. The cleaning liquid is supplied from the cleaning liquid supply apparatus 22 to the downstream circulation path and circulates in the downstream circulation path. The cleaning liquid is raised in temperature to a temperature suitable for CIP, such as 70° C. to 90° C., by the heat exchanging apparatus 24, and is circulated for a predetermined time. In the course of CIP, the cleaning liquid is raised in temperature to a required temperature for SIP, such as 140° C., and is circulated for a predetermined time. After that, the cleaning liquid is cooled by the heat exchanging apparatus 24, and when the temperature of the cleaning liquid is lowered to a temperature lower than 100° C., aseptic water is supplied from the aseptic water supply apparatus 27 to wash the cleaning liquid away while cooling the downstream piping portion 7*c*.

Figure 14:
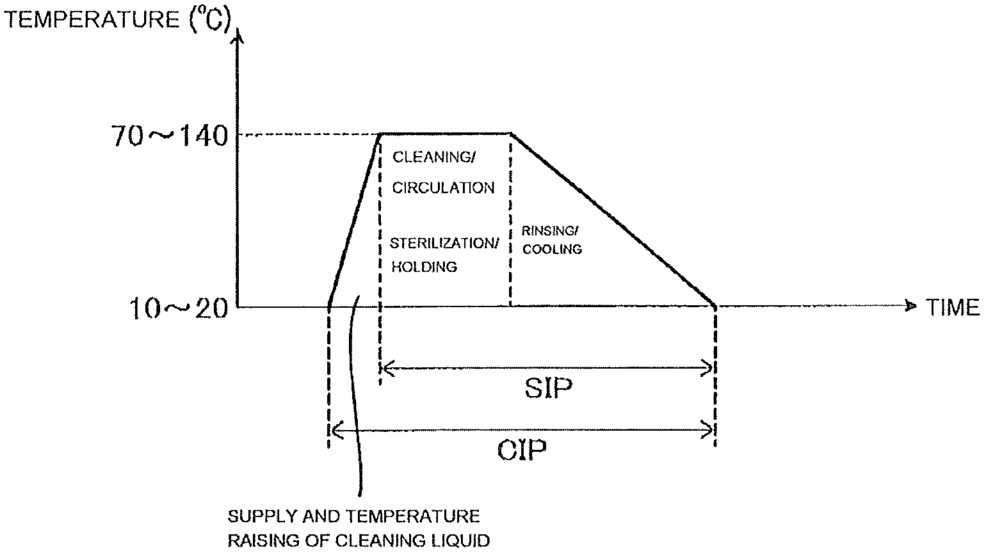
FIG. 14 is a graph showing the temperature of the filling nozzle when SIP of the downstream piping portion of the aseptic filling machine according to the embodiment of the present invention using the cleaning liquid is started in an early stage of CIP.

FIG. 14 is a graph showing the temperature of the filling nozzle 2*a* when SIP of the downstream piping portion 7*c* of the aseptic filling machine using the cleaning liquid is started in an early stage of CIP. The cleaning liquid is supplied from the cleaning liquid supply apparatus 22 to the downstream circulation path, and circulates in the downstream circulation path. The cleaning liquid is raised in temperature to a temperature that is suitable for CIP and required for SIP, such as 70° C. to 140° C., by the heat exchanging apparatus 24, and is circulated for a predetermined time. After that, the cleaning liquid is cooled by the heat exchanging apparatus 24, and when temperature of the cleaning liquid is lowered to a temperature lower than 100° C., aseptic water is supplied from the aseptic water supply apparatus 27 to wash the cleaning liquid away while cooling the downstream piping portion 7*c*.

Figure 15:
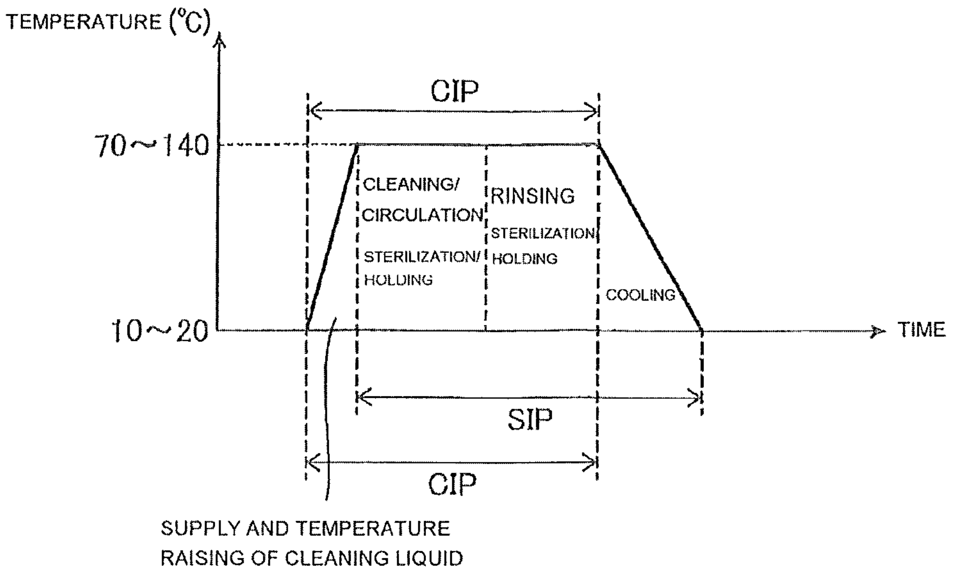
FIG. 15 is a graph showing the temperature of the filling nozzle when SIP of the downstream piping portion of the aseptic filling machine according to the embodiment of the present invention using the cleaning liquid and rinse water is started in an early stage of CIP.

FIG. 15 is a graph showing the temperature of the filling nozzle 2*a* when SIP of the downstream piping portion 7*c* of the aseptic filling machine using the cleaning liquid and the rinse water is started in an early stage of CIP. The cleaning liquid is supplied from the cleaning liquid supply apparatus 22 to the downstream circulation path and circulates in the downstream circulation path. The cleaning liquid is raised in temperature to a temperature that is suitable for CIP and SIP, such as 70° C. to 140° C., by the heat exchanging apparatus 24, and is circulated for a predetermined time. After that, aseptic water is supplied from the aseptic water supply apparatus 27 to the downstream circulation path to wash the cleaning liquid away. In this process, the aseptic water is supplied while being heated to a temperature approximately equal to the temperature of the cleaning liquid having been circulated. The cleaning liquid is replaced with the aseptic water while being heated to the required temperature for SIP, and SIP is also performed at the same time. The cleaning liquid in the downstream circulation path is replaced with the aseptic water, and the aseptic water is circulated for a predetermined time. After that, the aseptic water is cooled by the heat exchanging apparatus 24.

Figure 16:
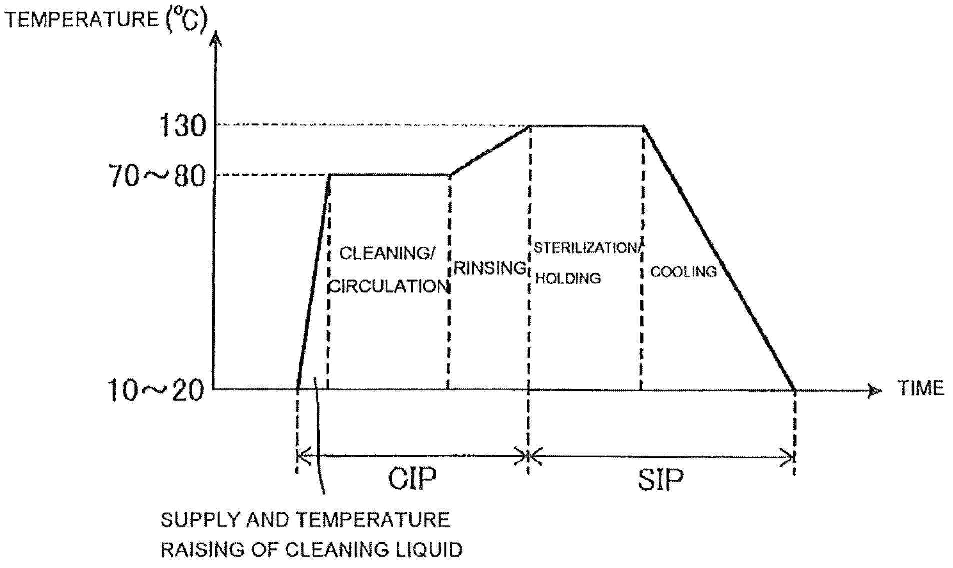
FIG. 16 is a graph showing the temperature of the filling nozzle when SIP of the downstream piping portion of the aseptic filling machine according to the embodiment of the present invention is performed after CIP of the downstream piping portion.

FIG. 16 is a graph showing the temperature of the filling nozzle 2*a* when SIP of the downstream piping portion 7*c* of the aseptic filling machine is performed after CIP. The cleaning liquid is supplied from the cleaning liquid supply apparatus 22 to the downstream circulation path and circulates in the downstream circulation path. The cleaning liquid is raised in temperature to a temperature suitable for CIP, such as 70° C. to 80° C., by the heat exchanging apparatus 24, and is circulated for a predetermined time. After that, aseptic water is supplied from the aseptic water supply apparatus 27 to the downstream circulation path to wash the cleaning liquid away. In this process, the supplied aseptic water circulates while the temperature of the aseptic water is raised to a required temperature for SIP. The cleaning liquid is replaced with the aseptic water while being heated to the required temperature for SIP, and the aseptic water raised in temperature to the required temperature for SIP then circulates in the downstream circulation path. The aseptic water is circulated for a predetermined time, and after that, the aseptic water is cooled by the heat exchanging apparatus 24.

The SIP in the specific examples described above is ended when the minimum value of the calculated F values reaches a target value.

(Manufacturing Process)

After the rinsing ends, the manufacturing process is started in which the drink passes through the heat sterilization apparatus 18 and the upstream piping portion 7*a* and is stored in the aseptic surge tank 19, from which the drink then passes through the downstream piping portion 7*c*, and then the filling operation for filling the bottles 4 with the drink.

Figure 5:
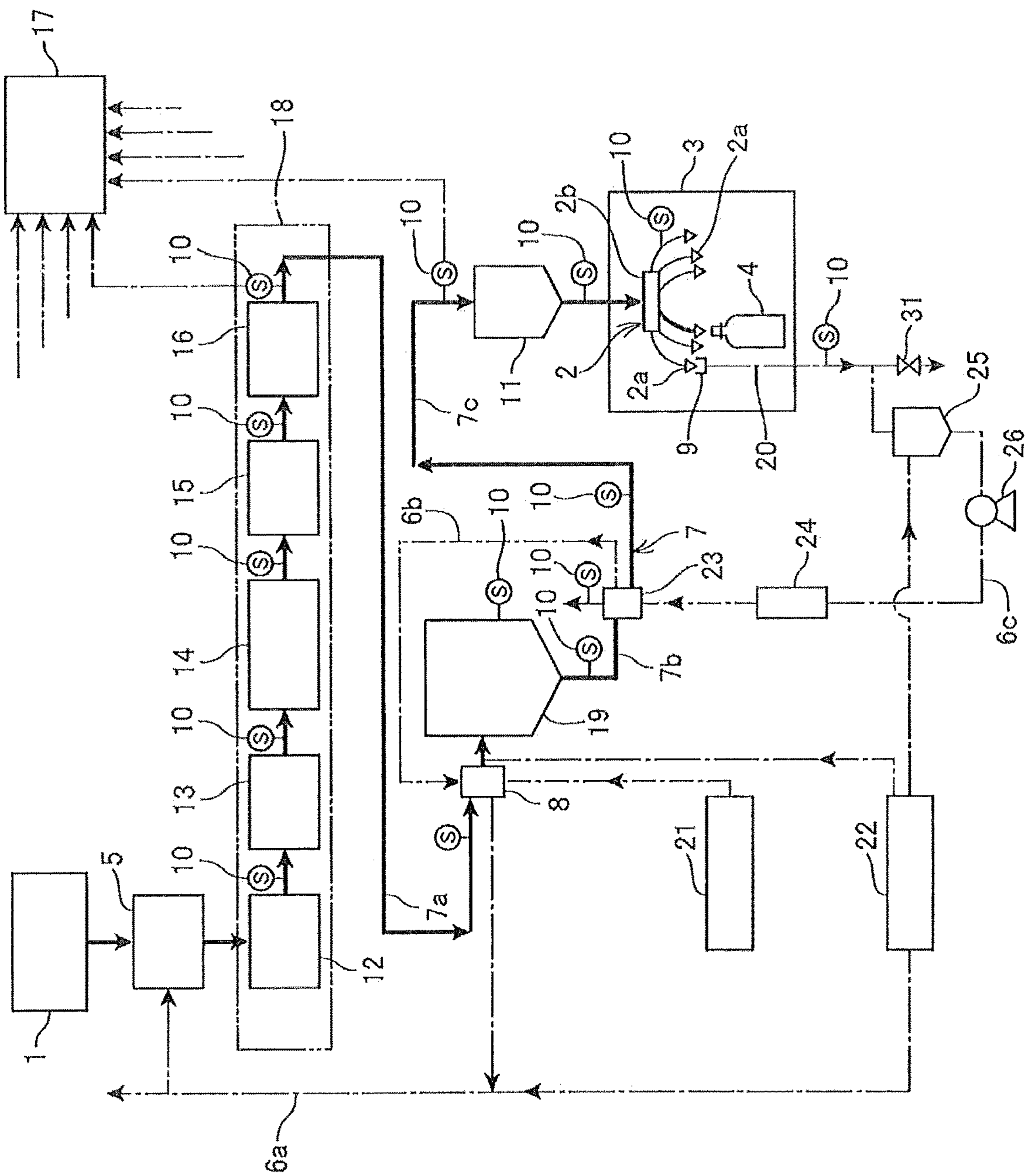
FIG. 5 is a block diagram showing a drink product manufacturing process by the aseptic filling machine according to the embodiment of the present invention.

As shown by the thick line in FIG. 5, in the manufacturing process, the drink prepared by the preparation apparatus 1 passes through the upstream piping portion 7*a*, the aseptic surge tank piping portion 7*b* and the downstream piping portion 7*c* of the drink supply piping 7 sterilized and reaches the inside of the filler 2, and the bottles 4, which are containers, are filled with the drink from the filling nozzles 2*a* of the filler 2. The bottles 4 filled with the drink are capped by a capper (not shown), and then fed to the outside of the aseptic filling machine.

Figure 8:
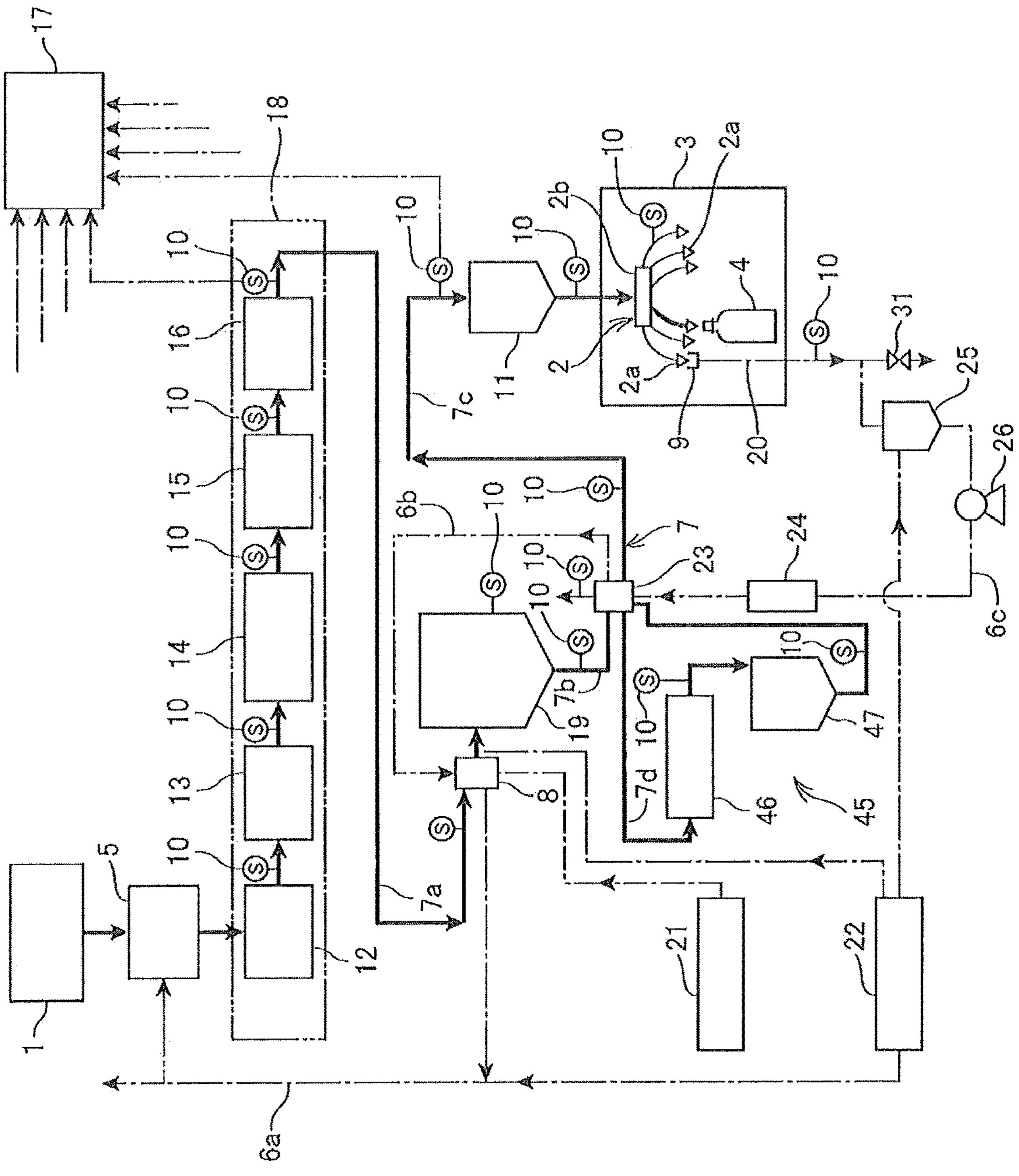
FIG. 8 is a block diagram showing a drink product manufacturing process by the aseptic filling machine for a drink containing a carbon dioxide gas according to the embodiment of the present invention.

As for the drink containing carbon dioxide gas, as shown by the thick line in FIG. 8, in the manufacturing process, the drink prepared by the preparation apparatus 1 passes through the upstream piping portion 7*a*, the aseptic surge tank piping portion 7*b*, the carbonating piping portion 45 and the downstream piping portion 7*c* of the drink supply piping 7 sterilized and reaches the inside, of the filler 2, and the bottles 4, which are containers, are filled with the drink from the filling nozzles 2*a* of the filler 2. The bottles 4 filled with the carbonated drink are capped by a capper (not shown), and then fed to the outside of the aseptic filling machine.

Although the present invention is configured as described above, the present invention is not limited to the embodiment described above, and various modifications are possible without departing from the scope of the spirit of the present invention. The container to be filled with a drink by the aseptic filling machine is not limited to the bottle, the aseptic filling machine can fill cups, trays or cans with a drink, for example. Furthermore, the material of the container is not limited to plastics and may be any material, such as a composite of paper and plastics, glass or metal.

REFERENCE SIGNS LIST

2 filler
2*a* filling nozzle
2*b* filler manifold
6*a* upstream feedback path
6*b* aseptic surge tank feedback path
6*c* downstream feedback path
7 drink supply piping
7*a* upstream piping portion
7*b* aseptic surge tank piping portion
7*c* downstream piping portion
8 upstream manifold valve
10 temperature sensor
17 controller
18 heat sterilization apparatus
19 aseptic surge tank
21 heated steam supply apparatus
22 cleaning liquid supply apparatus
23 downstream manifold valve
24 heat exchanging apparatus
25 downstream storage tank
26 downstream circulation pump
27 aseptic water supply apparatus
28 aseptic air supply apparatus
30 backpressure valve
33 reverse-flow backpressure valve
34 filler wheel
41 carbon dioxide gas supply piping
42 carbon dioxide gas discharge piping
45 carbonating piping portion
46 carbonating apparatus
47 carbonated drink surge tank

The invention claimed is:

1. A cleaning and sterilizing method for an aseptic filling machine, the aseptic filling machine including drink supply piping for feeding a drink to an inside of a filler via a heat sterilization apparatus, wherein an upstream piping portion of the drink supply piping that extends through the heat sterilization apparatus is provided with an upstream feedback path to form an upstream circulation path, an aseptic surge tank piping portion that includes an aseptic surge tank that stores the drink sterilized by the heat sterilization apparatus is provided with an aseptic surge tank feedback path to form an aseptic surge tank circulation path, a downstream piping portion that extends to a filling nozzle via a filler tank that stores the drink supplied from the aseptic surge tank is provided with a downstream feedback path to form a downstream circulation path, and the upstream piping portion, the aseptic surge tank piping portion and the downstream piping portion are individually subjected to CIP (Cleaning in Place) and SIP (Sterilizing in Place).

2. The cleaning and sterilizing method for an aseptic filling machine according to claim 1, wherein a carbonating piping portion that includes a carbonating apparatus that carbonates the drink sterilized supplied from the aseptic surge tank storing the drink forms a carbonating circulation path, and the carbonating circulation path is individually subjected to CIP and SIP.

3. The cleaning and sterilizing method for an aseptic filling machine according to claim 2, wherein the CIP is performed in which a cleaning liquid is circulated in the carbonating circulation path to remove a residue or the like of the drink deposited in the carbonating piping portion, a temperature of the cleaning liquid is raised to a required temperature for the SIP for sterilizing the carbonating piping portion in an early stage or in the course of the CIP of the carbonating circulation path, the SIP being performed following the CIP, the SIP of the carbonating piping portion is then performed, and the cleaning liquid is washed away by aseptic water.

4. The cleaning and sterilizing method for an aseptic filling machine according to claim 2, wherein when performing CIP of the downstream piping portion by circulating a cleaning liquid in the downstream circulation path, a circulation that involves flowing the cleaning liquid from the filler tank to the filling nozzle and a circulation that involves flowing the cleaning liquid in a reverse direction from the filling nozzle to the filler tank are performed.

5. The cleaning and sterilizing method for an aseptic filling machine according to claim 1, wherein the CIP is performed in which a cleaning liquid is circulated in the upstream circulation path, the aseptic surge tank circulation path and the downstream circulation path to remove a residue or the like of the drink deposited in the upstream piping portion, the aseptic surge tank piping portion and the downstream piping portion, a temperature of the cleaning liquid is raised to a required temperature for the SIP for sterilizing at least one of the upstream piping portion, the aseptic surge tank piping portion and the downstream piping portion in an early stage or in the course of the CIP of at least one of the upstream circulation path, the aseptic surge tank circulation path and the downstream circulation path, the SIP being performed following the CIP, the SIP of at least one of the upstream piping portion, the aseptic surge tank portion and the downstream piping portion is then performed, and the cleaning liquid is washed away by aseptic water.

6. The cleaning and sterilizing method for an aseptic filling machine according to claim 5, wherein the CIP is performed in which the cleaning liquid is circulated in the downstream circulation path, a temperature of the cleaning liquid is raised to a required temperature for the SIP for sterilizing the downstream piping portion in an early stage or in the course of the CIP, the SIP being performed following the CIP, the SIP of the downstream piping portion is then performed, and after the SIP, when lowering the temperature of the cleaning liquid or the aseptic water, a backpressure valve provided in the downstream circulation path is regulated to keep a pressure in the downstream circulation path to be equal to or higher than an atmospheric pressure.

7. The cleaning and sterilizing method for an aseptic filling machine according to claim 1, wherein the SIP of the aseptic surge tank is performed using heated steam.

8. The cleaning and sterilizing method for an aseptic filling machine according to claim 1, wherein when performing CIP of the downstream piping portion by circulating a cleaning liquid in the downstream circulation path, a circulation that involves flowing the cleaning liquid from the filler tank to the filling nozzle and a circulation that involves flowing the cleaning liquid in a reverse direction from the filling nozzle to the filler tank are performed.

9. The cleaning and sterilizing method for an aseptic filling machine according to claim 8, wherein a large number of filling nozzles for filling containers with the drink provided in the downstream piping portion are divided into a plurality of subsets, and a circulation that involves flowing the cleaning liquid from the filler tank to a divisional subset of filling nozzles and a circulation that involves flowing the cleaning liquid in a reverse direction from the divisional subsets of filling nozzles to the filler tank are performed.

10. The cleaning and sterilizing method for an aseptic filling machine according to claim 8, wherein when performing the SIP by circulating the cleaning liquid in the downstream circulation path, a circulation that involves flowing the cleaning liquid from the filler tank to the filling nozzle and a circulation that involves flowing the cleaning liquid in a reverse direction from the filling nozzle to the filler tank are performed.

11. An aseptic filling machine comprising drink supply piping for feeding a drink to an inside of a filler via a heat sterilization apparatus, wherein an upstream piping portion of the drink supply piping that extends through the heat sterilization apparatus is provided with an upstream feedback path to form an upstream circulation path, an aseptic surge tank piping portion that includes an aseptic surge tank that stores the drink sterilized by the heat sterilization apparatus is provided with an aseptic surge tank feedback path to form an aseptic surge tank circulation path, a downstream piping portion that extends to filling nozzles via a filler tank that stores the drink supplied from the aseptic surge tank is provided with a downstream feedback path to form a downstream circulation path, and the upstream piping portion, the aseptic surge tank piping portion and the downstream piping portion are individually subjected to CIP (Cleaning in Place) and SIP (Sterilizing in Place).

12. The aseptic filling machine according to claim 11, wherein a carbonating piping portion that includes a carbonating apparatus that carbonates the drink sterilized supplied from the aseptic surge tank storing the drink forms a carbonating circulation path, and the carbonating circulation path is individually subjected to CIP and SIP.

13. The aseptic filling machine according to claim 12, further comprising: a cleaning liquid supply apparatus that supplies a cleaning liquid to the carbonating circulation path; and a heat exchanging apparatus that heats the cleaning liquid supplied to the carbonating circulation path from the cleaning liquid supply apparatus or aseptic water supplied to the carbonating circulation path to a required temperature for the SIP.

14. The aseptic filling machine according to claim 12, wherein a backpressure valve is provided in the downstream circulation path, the backpressure valve being for keeping a pressure in the downstream circulation path to be equal to or higher than an atmospheric pressure when lowering the temperature of the cleaning liquid or the aseptic water after the SIP performed by heating the cleaning liquid or the aseptic water.

15. The aseptic filling machine according to claim 12, wherein the downstream circulation path is configured so that, when circulating the cleaning liquid in the downstream circulation path, a circulation that involves flowing the cleaning liquid from the filler tank to the filling nozzles and a circulation that involves flowing the cleaning liquid in a reverse direction from the filling nozzles to the filler tank are performed.

16. The aseptic filling machine according to claim 11, further comprising: a cleaning liquid supply apparatus that supplies a cleaning liquid to the upstream circulation path, the aseptic surge tank circulation path and the downstream circulation path; and a heat exchanging apparatus that heats the cleaning liquid supplied from the cleaning liquid supply apparatus or aseptic water to a required temperature for the SIP.

17. The aseptic filling machine according to claim 11, further comprising heated steam supply apparatus that supplies heated steam to the aseptic surge tank.

18. The aseptic filling machine according to claim 11, wherein a backpressure valve is provided in the downstream circulation path, the backpressure valve being for keeping a pressure in the downstream circulation path to be equal to or higher than an atmospheric pressure when lowering the temperature of the cleaning liquid or the aseptic water after the SIP performed by heating the cleaning liquid or the aseptic water.

19. The aseptic filling machine according to claim 11, wherein the downstream circulation path is configured so that, when circulating the cleaning liquid in the downstream circulation path, a circulation that involves flowing the cleaning liquid from the filler tank to the filling nozzles and a circulation that involves flowing the cleaning liquid in a reverse direction from the filling nozzles to the filler tank are performed.

20. The aseptic filling machine according to claim 19, wherein the filling nozzles are divided into a plurality of subsets, and a divisional downstream circulation path from the filler tank to a divisional subset of filling nozzles is formed, and the divisional downstream circulation path is configured so that, when circulating the cleaning liquid in the divisional downstream circulation path, a circulation that involves flowing the cleaning liquid from the filler tank to the divisional subset of filling nozzles and a circulation that involves flowing the cleaning liquid in a reverse direction from the divisional subset of filling nozzles to the filler tank are performed.

* * * * *